(12) United States Patent
Kaihatsu et al.

(10) Patent No.: US 10,708,483 B2
(45) Date of Patent: Jul. 7, 2020

(54) INFORMATION PROCESSING DEVICE AND INFORMATION PROCESSING METHOD, SOLID-STATE IMAGING DEVICE AND SOLID-STATE IMAGING DEVICE OPERATION METHOD, PROGRAM, AND ELECTRONIC APPARATUS

(71) Applicant: Sony Semiconductor Solutions Corporation, Kanagawa (JP)

(72) Inventors: Minoru Kaihatsu, Kanagawa (JP); Shinichi Ohtsubo, Kanagawa (JP); Riichi Ono, Fukuoka (JP); Hiroaki Anai, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/746,815

(22) PCT Filed: Jul. 15, 2016

(86) PCT No.: PCT/JP2016/071060
§ 371 (c)(1),
(2) Date: Jan. 23, 2018

(87) PCT Pub. No.: WO2017/022462
PCT Pub. Date: Feb. 9, 2017

(65) Prior Publication Data
US 2018/0309923 A1 Oct. 25, 2018

(30) Foreign Application Priority Data

Jul. 31, 2015 (JP) .................................. 2015-152907

(51) Int. Cl.
*H04N 5/232* (2006.01)
*G02B 7/28* (2006.01)
(Continued)

(52) U.S. Cl.
CPC .......... *H04N 5/23203* (2013.01); *G02B 7/08* (2013.01); *G02B 7/09* (2013.01); *G02B 7/28* (2013.01);
(Continued)

(58) Field of Classification Search
CPC .......... H04N 5/23203; H04N 5/23212; H04N 5/23209; G03B 13/36; G02B 7/09; G02B 7/28; G02B 7/08; G06F 13/42
See application file for complete search history.

(56) References Cited

U.S. PATENT DOCUMENTS 7,656,447 B2 * 2/2010 Choi .................... H04N 5/2257
348/294
7,821,550 B2 * 10/2010 Yamashina ............ H04N 7/181
348/143
(Continued)

FOREIGN PATENT DOCUMENTS

| JP | 2004-021421 A | 1/2004 |
| JP | 2011-118242 A | 6/2011 |
| JP | 2012-194399 A | 10/2012 |

OTHER PUBLICATIONS

International Search Report and Written Opinion and English translation thereof dated Sep. 6, 2016 in connection with International Application No. PCT/JP2016/071060.
(Continued)

*Primary Examiner* — Hung H Lam
(74) *Attorney, Agent, or Firm* — Wolf, Greenfield & Sacks, P.C.

(57) ABSTRACT

The present technology relates to an information processing device and an information processing method, a solid-state imaging device and a solid-state imaging device operation method, a program, and an electronic apparatus in which an IC having an AF lens drive control unit mounted therein is
(Continued)

made compatible with various communication specifications that vary with the types of lens driver ICs to be connected. A digital analogue converter (DAC) code for controlling a lens driver IC that controls driving of an actuator that drives a focusing lens is generated. A communication format related to serial communication is set in accordance with the lens driver IC, and is stored. The DAC code is buried in the communication format, to form a format compatible with the lens driver IC. Control is performed to cause the DAC code to be transmitted to the lens driver IC through serial communication. The present technology can be applied to imaging apparatuses.

19 Claims, 20 Drawing Sheets

(51) Int. Cl.
| | | |
|---|---|---|
| *G06F 13/42* | (2006.01) | |
| *G02B 7/08* | (2006.01) | |
| *G02B 7/09* | (2006.01) | |
| *G03B 13/36* | (2006.01) | |

(52) U.S. Cl.
CPC ............. *G03B 13/36* (2013.01); *G06F 13/42* (2013.01); *H04N 5/23209* (2013.01); *H04N 5/23212* (2013.01)

(56) References Cited

U.S. PATENT DOCUMENTS

| | | | | |
|---|---|---|---|---|
| 9,172,523 | B2* | 10/2015 | Okada | G03B 17/14 |
| 9,544,483 | B2* | 1/2017 | Nakata | H04N 5/23209 |
| 2006/0023070 | A1* | 2/2006 | Nakamura | H04N 5/2254 |
| | | | | 348/207.99 |
| 2009/0245778 | A1* | 10/2009 | Shibuno | G02B 7/102 |
| | | | | 396/135 |
| 2011/0135293 | A1 | 6/2011 | Shitomi | |
| 2013/0182175 | A1* | 7/2013 | Yasuda | G03B 3/10 |
| | | | | 348/360 |

OTHER PUBLICATIONS

International Preliminary Report on Patentability and English translation thereof dated Feb. 15, 2018 in connection with International Application No. PCT/JP2016/071060.

\* cited by examiner

INFORMATION PROCESSING DEVICE AND INFORMATION PROCESSING METHOD, SOLID-STATE IMAGING DEVICE AND SOLID-STATE IMAGING DEVICE OPERATION METHOD, PROGRAM, AND ELECTRONIC APPARATUS

This is a U.S. National Stage Application under 35 U.S.C. § 371, based on International Application No. PCT/JP2016/071060, filed Jul. 15, 2016, entitled "INFORMATION PROCESSING DEVICE AND INFORMATION PROCESSING METHOD, SOLID-STATE IMAGING DEVICE AND SOLID-STATE IMAGING DEVICE OPERATION METHOD, PROGRAM, AND ELECTRONIC APPARATUS", which claims priority to Japanese Patent Application JP2015-152907, filed Jul. 31, 2015, each of which is hereby incorporated by reference in its entirety.

TECHNICAL FIELD

The present technology relates to information processing devices and information processing methods, solid-state imaging devices and solid-state imaging device operation methods, programs, and electronic apparatuses, and more particularly, to an information processing device and an information processing method, a solid-state imaging device and a solid-state imaging device operation method, a program, and an electronic apparatus in which an IC having an AF lens drive control unit mounted therein is made compatible with various communication specifications that vary with the types of lens driver ICs to be connected.

BACKGROUND ART

An integrated circuit (IC) in which an autofocus drive control unit is mounted and a lens driver IC are normally connected by serial communication such as inter-integrated circuit (I2C) communication, and the IC having the drive control unit mounted therein is designed to control driving of the lens driver IC.

The communication format specifications of lens driver ICs vary with makers and products. The drive control unit side that controls driving of a lens driver IC should have a transmission format portion mounted therein in accordance with the communication format specification of the lens driver IC to be connected thereto.

Further, as for an actuator that moves an autofocus (AF) lens, there is a type that moves the lens position with a bidirectional current value. As for lens driver ICs that drive the actuator, there are a type that associates drive current values only with "unsigned" or positive values as input digital analog converter (DAC) code specifications, and a type that associates drive current values with "signed" or positive and negative values. The AF control system side needs to prepare the DAC code values to be output, in accordance with the input DAC code specification of the lens driver IC to be connected thereto.

In view of this, a technology for automatically determining the types of communication formats of different lens driver ICs or the like and then switching transmission formats has been suggested (see Patent Document 1).

CITATION LIST

Patent Documents

Patent Document 1: Japanese Patent Application Laid-Open No. 2004-021421

SUMMARY OF THE INVENTION

Problems to be Solved by the Invention

If the lens driver IC to be connected to the IC in which the AF lens drive control unit is mounted is determined to be of one type in advance, a special-purpose transmission format should be prepared. However, in a case where the drive control unit is made compatible with various types so as to be connected to lens driver ICs of more than one type, transmission formats corresponding to the communication format specifications of the respective lens driver ICs need to be prepared.

Also, similarly, in a case where the AF lens drive control unit is made compatible with various types so as to be connected to lens driver ICs of more than one type, output DAC codes need to be prepared in accordance with the input DAC code specifications of the respective lens driver ICs.

The present technology has been developed in view of those circumstances, and particularly aims to make an IC in which an AF lens drive control unit is mounted compatible with various communication specifications that vary with the types of lens driver ICs to be connected thereto.

Solution to Problems

An information processing device of a first aspect of the present technology is an information processing device that includes: a control information generation unit that generates control information for controlling a current control target device to be controlled; a storage unit that stores a parameter that is set in accordance with the current control target device; a communication unit that communicates with the current control target device through serial communication; a transmission information generation unit that generates transmission information in a format compatible with the current control target device, in accordance with the control information and the parameter stored in the storage unit; and a communication control unit that performs control to cause the communication unit to transmit the transmission information to the current control target device.

The information processing device may further include: an imaging device that forms an image; a lens that adjusts a focal point of light incident on the imaging device; and an actuator that drives the lens. The current control target device may be a lens driver integrated circuit (IC) that controls driving of the actuator, and the control information generation unit may generate an actuator control value as the control information, the actuator control value being for the lens driver IC to control the driving of the actuator.

The storage unit may store a format related to the serial communication as the parameter.

The storage unit may store data as the parameter in addition to the format related to the serial communication, the data being invariably input to the format.

The storage unit may store at least one value as the data to be invariably input to the format, the at least one value being at least one of an identification value for identifying the lens driver IC, a communication amount, and a position of the actuator control value in the format, the at least one value being stored as the parameter.

The storage unit may store a format related to transmission of the actuator control value through the serial communication, the format being stored as the parameter.

The storage unit may store a format related to a request for information about an operation status of the lens driver IC at a time when the actuator control value is transmitted to the lens driver IC through the serial communication, the format being stored as the parameter.

In addition to the format related to the request for the information about an operation status of the lens driver IC at the time when the actuator control value is transmitted to the lens driver IC through the serial communication, the storage unit may store information related to error processing at a time when an error occurs in response to the request for the information about an operation status of the lens driver IC, the information related to error processing being stored as the parameter.

The storage unit may store an offset value as the data to be invariably input to the format, the offset value being of an actuator control value corresponding to the lens driver IC, the offset value being stored as the parameter. The information processing device may further include an offset calculation unit that calculates an offset of the actuator control value using the offset value. The transmission information generation unit may generate transmission information in accordance with the actuator control value corresponding to the lens driver IC having the actuator control value offset calculated by the offset calculation unit, and the communication control unit may perform control to cause the communication unit to transmit the transmission information to the lens driver IC.

The serial communication may include an inter-integrated circuit (I2C) method and a serial peripheral interface (SPI) method.

The storage unit may store a parameter through a preset process, the parameter being set in accordance with the current control target device.

The storage unit may store a parameter as a binarized binary program is loaded, the parameter being set in accordance with the current control target device.

An information processing method of the first aspect of the present technology is an information processing method that includes the steps of: generating control information for controlling a current control target device to be controlled; storing a parameter that is set in accordance with the current control target device; communicating with the current control target device through serial communication; generating transmission information in a format compatible with the current control target device, in accordance with the control information and the stored parameter; and performing control to cause the transmission information to be transmitted to the current control target device.

A program of the first aspect of the present technology is a program for causing a computer to function as: a control information generation unit that generates control information for controlling a current control target device to be controlled; a storage unit that stores a parameter that is set in accordance with the current control target device; a communication unit that communicates with the current control target device through serial communication; a transmission information generation unit that generates transmission information in a format compatible with the current control target device, in accordance with the control information and the parameter stored in the storage unit; and a communication control unit that performs control to cause the communication unit to transmit the transmission information to the current control target device.

In the first aspect of the present technology, control information for controlling a current control target device to be controlled is generated, a parameter that is set in accordance with the current control target device is stored, communication with the current control target device is made through serial communication, transmission information in a format compatible with the current control target device is generated in accordance with the control information and the stored parameter, and control is performed to cause the transmission information to be transmitted to the current control target device.

A solid-state imaging device of a second aspect of the present technology is a solid-state imaging device that includes: an imaging device that forms an image; a lens that adjusts a focal point of light incident on the imaging device; an actuator that drives the lens; a control information generation unit that generates control information for controlling a lens driver IC that controls driving of the actuator; a storage unit that stores a parameter that is set in accordance with the lens driver IC; a communication unit that communicates with the lens driver IC through serial communication; a transmission information generation unit that generates transmission information in a format compatible with the lens driver IC, in accordance with the control information and the parameter stored in the storage unit; and a communication control unit that performs control to cause the communication unit to transmit the transmission information to the lens driver IC.

The solid-state imaging device may further include: a signal processing unit that processes a pixel signal captured by the imaging device; and a circuit board in which the control information generation unit, the communication unit, the storage unit, the communication control unit, and the signal processing unit are provided. A substrate in which the imaging device is provided and the circuit board may be integrally formed.

A solid-state imaging device operation method of the second aspect of the present technology is a method of operating a solid-state imaging device that includes: an imaging device that forms an image; a lens that adjusts a focal point of light incident on the imaging device; and an actuator that drives the lens. The method includes the steps of: generating control information for controlling a lens driver IC that controls driving of the actuator; storing a parameter that is set in accordance with the lens driver IC; communicating with the lens driver IC through serial communication; generating transmission information in a format compatible with the lens driver IC, in accordance with the control information and the stored parameter; and performing control to cause the transmission information to be transmitted to the lens driver IC.

A program of the second aspect of the present technology is a program for causing a computer to function as: an imaging device that forms an image; a lens that adjusts a focal point of light incident on the imaging device; an actuator that drives the lens; a control information generation unit that generates control information for controlling a lens driver IC that controls driving of the actuator; a storage unit that stores a parameter that is set in accordance with the lens driver IC; a communication unit that communicates with the lens driver IC through serial communication; a transmission information generation unit that generates transmission information in a format compatible with the lens driver IC, in accordance with the control information and the parameter stored in the storage unit; and a communication control unit that performs control to cause the communication unit to transmit the transmission information to the lens driver IC.

An electronic apparatus of the second aspect of the present technology is an electronic apparatus that includes: an imaging device that forms an image; a lens that adjusts a focal point of light incident on the imaging device; an actuator that drives the lens; a control information generation unit that generates control information for controlling a lens driver IC that controls driving of the actuator; a storage unit that stores a parameter that is set in accordance with the lens driver IC; a communication unit that communicates with the lens driver IC through serial communication; a transmission information generation unit that generates transmission information in a format compatible with the lens driver IC, in accordance with the control information and the parameter stored in the storage unit; and a communication control unit that performs control to cause the communication unit to transmit the transmission information to the lens driver IC.

In the electronic apparatus of the second aspect of the present technology, an image is formed by an imaging device, a focal point of light incident on the imaging device is adjusted by a lens, the lens is driven by an actuator, control information for controlling a lens driver IC that controls driving of the actuator is generated by a control information generation unit, a parameter that is set in accordance with the lens driver IC is stored in a storage unit, communication with the lens driver IC through serial communication is made by a communication unit, transmission information in a format compatible with the lens driver IC is generated by a communication control unit in accordance with the control information and the stored parameter, and control is performed by a communication control unit to cause the transmission information to be transmitted to the lens driver IC.

The information processing device of the first aspect of the present technology and the solid-state imaging device of the second aspect may be devices independent of each other, or may be blocks that function as an information processing device and a solid-state imaging device.

Effects of the Invention

According to one aspect of the present technology, an IC in which an AF lens drive control unit is mounted can be made compatible with various communication specifications that vary with the types of lens driver ICs to be connected thereto.

MODES FOR CARRYING OUT THE INVENTION

Figure 1:
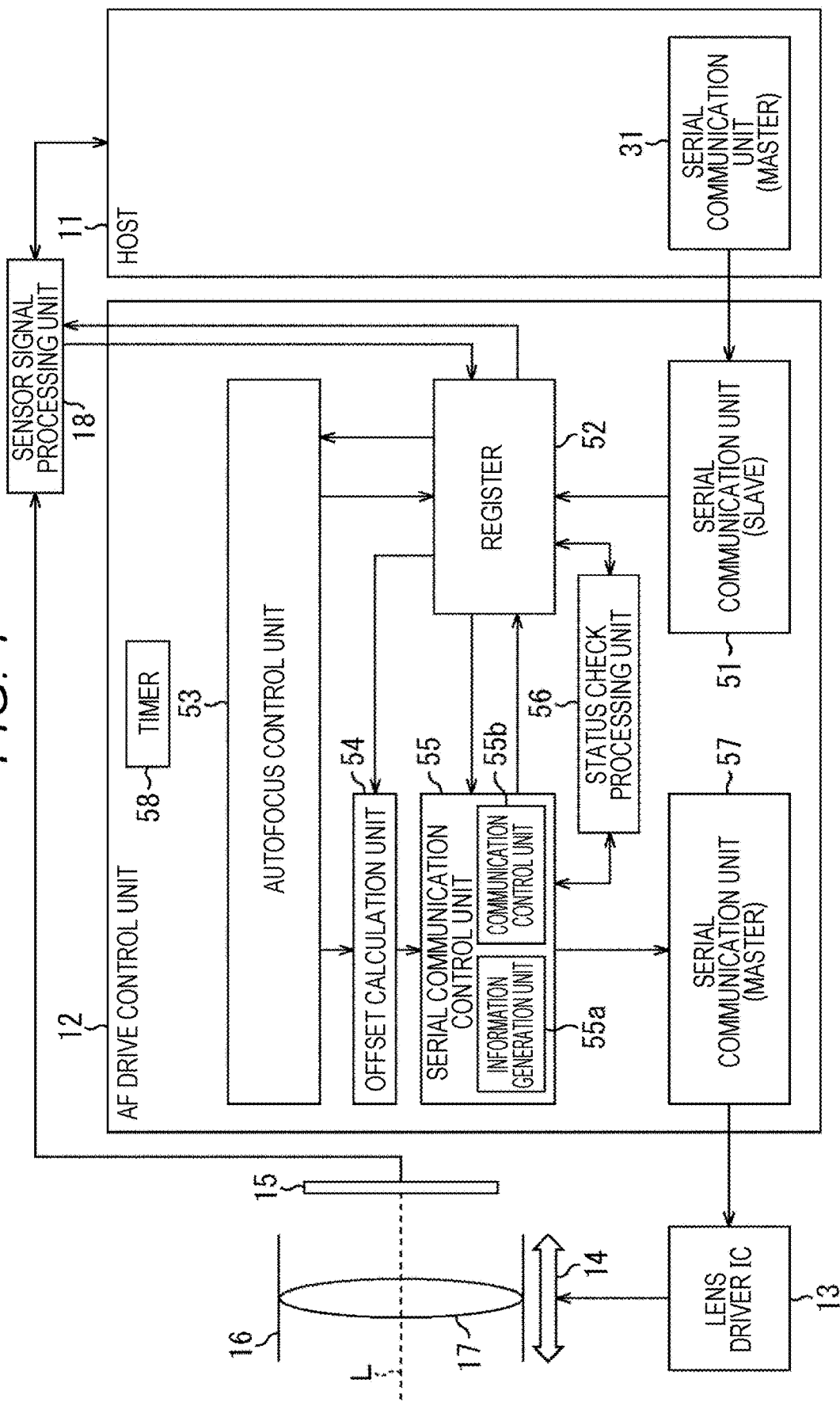
FIG. 1 is a diagram for explaining an example configuration of a first embodiment of an imaging apparatus to which the present technology is applied.

FIG. 1 shows an example configuration of an embodiment of an imaging apparatus to which the present technology is applied. Particularly, FIG. 1 shows in great detail an AF drive control unit that controls operation of an autofocus (AF) lens, and the peripherals.

The imaging apparatus in FIG. 1 has the configuration of a drive control unit for an autofocus (AF) lens and the peripherals shown in great detail, and includes a host 11, an AF drive control unit 12, a lens driver integrated circuit (IC) 13, an actuator 14, an imaging device 15, a lens tube 16, a lens 17, and a sensor signal processing unit 18.

The host 11 controls the entire operation of the imaging apparatus, and supplies various kinds of control settings to the AF drive control unit 12, for example. More specifically, the host 11 includes a serial communication unit 31 that functions as the master in I2C communications. The serial communication unit 31 communicates with a serial communication unit 51 of the AF drive control unit 12 that functions as the slave, to supply various kinds of control settings necessary for achieving an autofocus function using the lens 17.

The AF drive control unit 12 is controlled by the host 11, and, to autofocus, controls the lens driver IC 13 that operates the actuator 14 driving the lens 17.

More specifically, the AF drive control unit 12 includes the serial communication unit 51, a register 52, an autofocus control unit 53, an offset calculation unit 54, a serial communication control unit 55, a status check processing unit 56, a serial communication unit 57, and a timer 58.

The serial communication unit 51 functions as the slave in cooperation with the serial communication unit 31 of the host 11 that functions as the master in I2C communications. The serial communication unit 51 receives, from the host 11, various kinds of control settings that are designed to achieve autofocus and include the communication format for serial communications, and sets and stores the various kinds of control settings in the register 52.

In accordance with an image signal supplied from the sensor signal processing unit 18 to the register 52, the autofocus control unit 53 performs a calculation for adjusting the focal point of the lens 17 with respect to the imaging device 15, to calculate a control signal (control information) for controlling the lens driver IC 13. The autofocus control unit 53 outputs the control signal as a digital analogue converter (DAC) code to the offset calculation unit 54.

In accordance with an offset that is a control setting stored in the register 52, the offset calculation unit 54 offsets and adjusts the DAC code that is the control information for controlling the lens driver IC 13, to correct the DAC code to be an appropriate value for controlling the lens driver IC 13. The offset calculation unit 54 then supplies the DAC code to the serial communication control unit 55.

The serial communication control unit 55 includes an information generation unit 55a and a communication control unit 55b. The information generation unit 55a generates transmission information by burying the corrected DAC code in the communication format that is a control setting stored in the register 52. The communication control unit 55b supplies the transmission information to the serial communication unit 57, and controls the serial communication unit 57 to transmit the transmission information to the lens driver IC 13. The communication control unit 55b also writes information received from the lens driver IC 13 through the serial communication unit 57, into the register 52.

The serial communication unit 57 functions as the master in I2C communications, and communicates with the lens driver IC 13 functioning as the slave. More specifically, the serial communication unit 57 supplies the lens driver IC 13 with the transmission information that is supplied from the serial communication control unit 55 and has the DAC code buried therein. In doing so, the serial communication unit 57 requests status data as the communication state of the lens driver IC 13. The serial communication unit 57 then supplies the serial communication control unit 55 with the status data obtained as a result of the request. The serial communication control unit 55 controls the communication control unit 55b, to write the status data into the register 52.

Reading the status data from the register 52, the status check processing unit 56 determines the communication state (status) of the lens driver IC 13, and issues a retransmission instruction to the serial communication control unit 55 as necessary. The serial communication control unit 55 controls the communication control unit 55b, and checks the communication state in accordance with an instruction from the status check processing unit 56. If communication is possible, the serial communication control unit 55 transmits the transmission information generated by burying the DAC code in the format. In doing so, the status check processing unit 56 uses the timer 58 to count the waiting time or the like as necessary.

The lens driver IC 13 operates the actuator 14 in accordance with the DAC code buried in the transmission information supplied from the AF drive control unit 12.

The actuator 14 operates in conjunction with the lens 17, and moves the lens 17 backward and forward (rightward and leftward in the drawing) in the optical axis direction in the lens tube 16, and adjusts the focal position with respect to the imaging device 15.

The imaging device 15 is formed with a complementary metal oxide semiconductor (CMOS) image sensor or the like. The imaging device 15 receives light from an object via the lens 17 pixel by pixel, converts the light into a signal in accordance with the quantity of light, and then outputs the signal to the sensor signal processing unit 18.

The sensor signal processing unit 18 performs demosaicing and various kinds of processing on the signal supplied from the imaging device 15, to generate a pixel signal. The sensor signal processing unit 18 stores the pixel signal into the register 52 so that the pixel signal will be used in the calculation for achieving autofocus at the autofocus control unit 53. The sensor signal processing unit 18 also supplies the pixel signal to the host 11.

Outline of an Example Configuration of the Imaging Device

Figure 2:
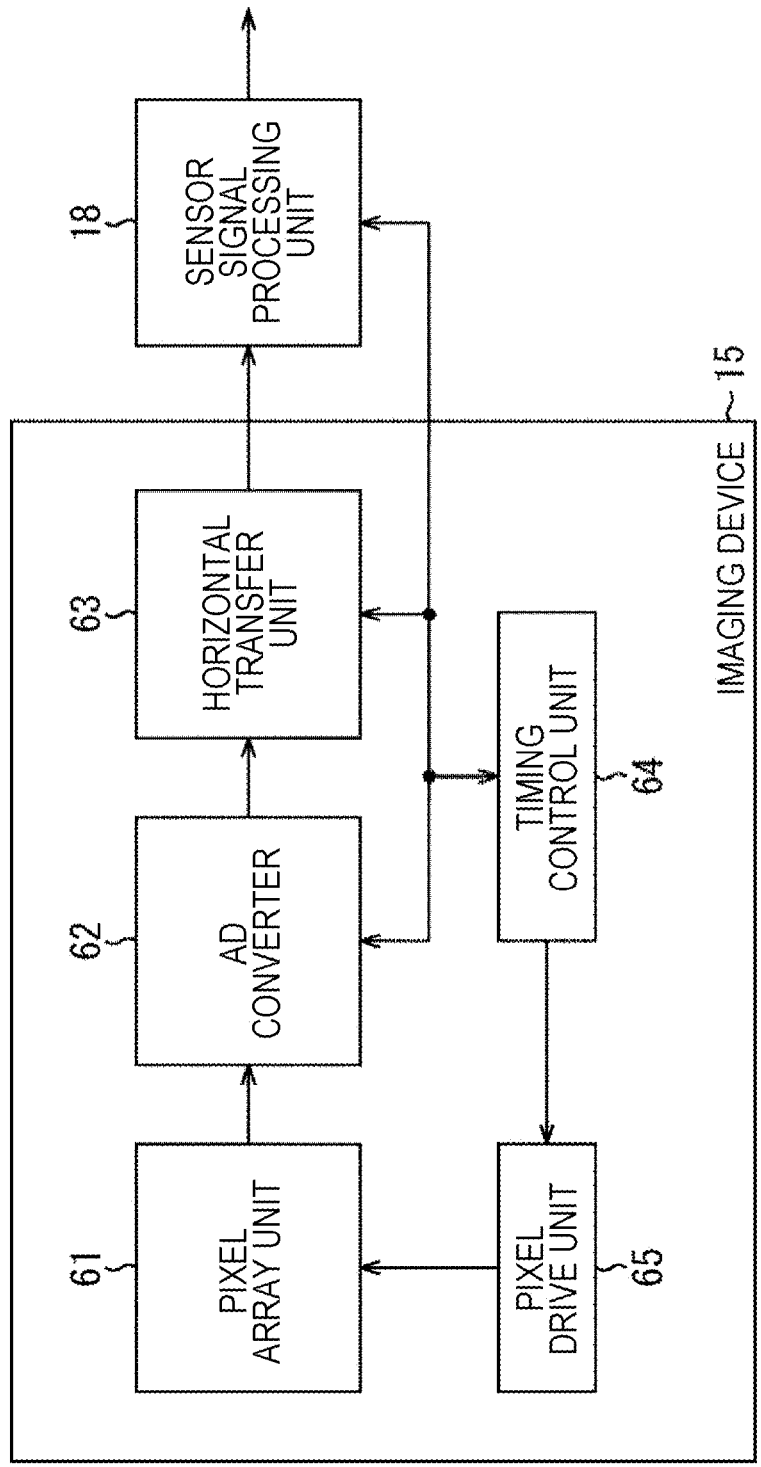
FIG. 2 is a diagram for explaining an example configuration of the imaging device shown in FIG. 1.

Referring now to FIG. 2, the configuration of the imaging device 15 is roughly described.

The imaging device 15 in FIG. 2 includes a pixel array unit 61, an AD converter 62, a horizontal transfer unit 63, a timing control unit 64, and a pixel drive unit 65. The pixel array unit 61, the AD converter 62, the horizontal transfer unit 63, the timing control unit 64, and the pixel drive unit 65 constitute the imaging device 15.

The pixel array unit 61 is formed with pixels arranged in a two-dimensional array (in row directions and column directions). The pixels each include a photodiode serving as a photoelectric conversion unit and pixel transistors (so-called MOS transistors). The pixel transistors may be formed with the three transistors: a transfer transistor, a reset transistor, and an amplification transistor, for example. Alternatively, each pixel may be formed with the four transistors: a select transistor and the above three transistors.

In the pixel array unit 61, light shielding pixels that are pixels for focal point detection, as well as pixels for outputting video images (these pixels will be hereinafter referred to as the normal pixels), may be arranged in a predetermined array.

The AD converter 62 includes analog-digital converters (ADCs) provided for the respective pixel columns of the pixel array unit 61. For each pixel column, the AD converter 62 performs a correlated double sampling (CDS) process on analog pixel signals output from the pixels of one row, and further performs an AD conversion process. The digital pixel signals subjected to the AD conversion process are output to the horizontal transfer unit 63.

The horizontal transfer unit 63 is formed with a horizontal scanning circuit or the like, and sequentially outputs the digital pixel signals stored in the respective ADCs in the AD converter 62, to the sensor signal processing circuit 1 at predetermined timings.

The timing control unit 64 is formed with a timing generator or the like that generates various kinds of timing signals, such as a vertical synchronization signal and a horizontal synchronization signal. The timing control unit 64 supplies the various kinds of timing signals generated by the timing generator to the AD converter 62, the horizontal transfer unit 63, the sensor signal processing unit 18, and the pixel drive unit 65, and thus controls operation timings of the respective components.

The pixel drive unit 65 is formed with a shift register, for example. The pixel drive unit 65 sequentially selects and scans the respective pixels of the pixel array unit 61 on a row-by-row basis in the vertical direction, and causes the pixel array unit 61 to output pixel signals in accordance with the signal charges generated in accordance with the quantities of light received in the photoelectric conversion units of the respective pixels, to the AD converter 62.

The imaging device 15 having the above configuration is formed as a column AD type CMOS image sensor in which the ADCs that perform the CDS process and the AD conversion process are provided for the respective pixel columns, for example.

Example Configuration of the Communication Format of the Lens Driver IC

Figure 3:
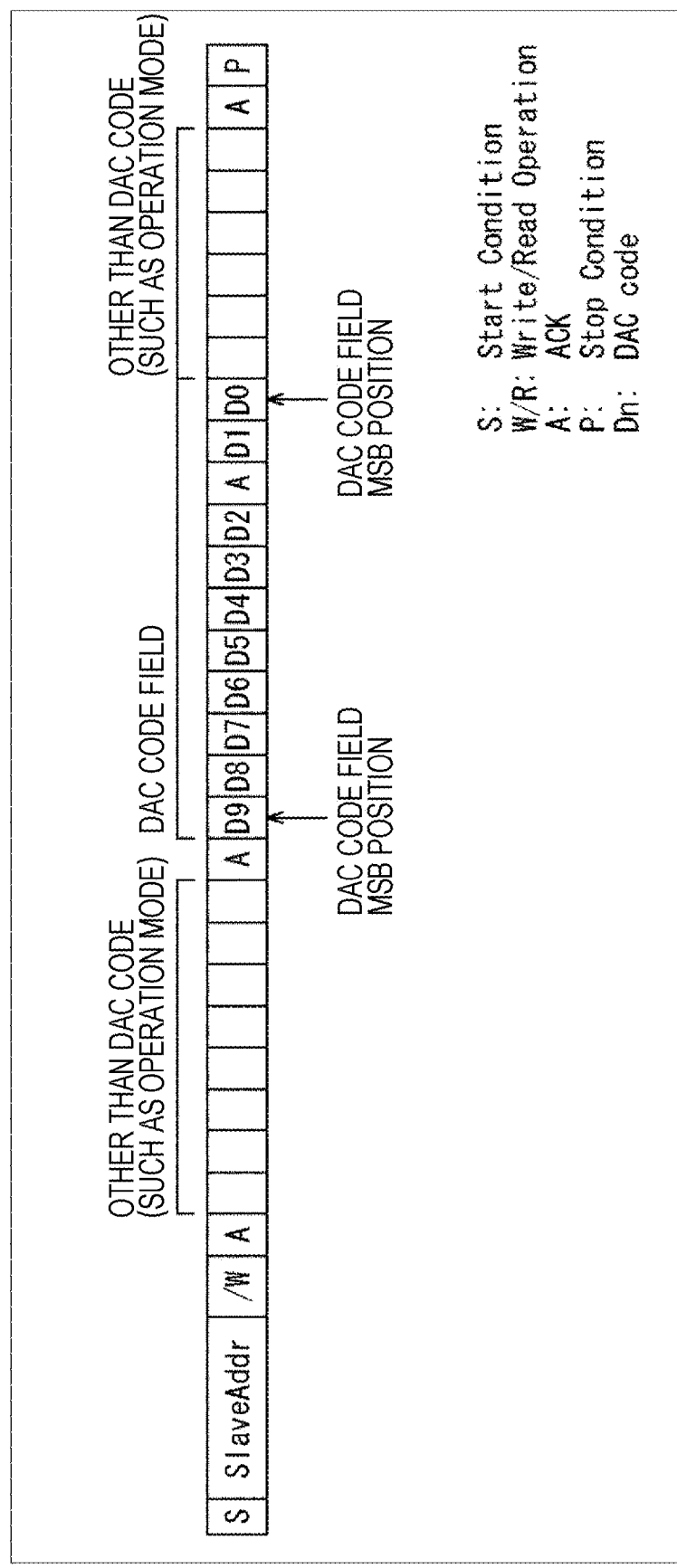
FIG. 3 is a diagram for explaining the format to be used when a DAC code is transmitted through a serial communication.

Referring now to FIG. 3, an example configuration of the communication format of the lens driver IC 13 is described.

FIG. 3 shows an example configuration of the communication format at the time when the serial communication unit 57 functioning as the master in I2C communications transmits a DAC code to the lens driver IC 13 functioning as the slave.

In the communication format in FIG. 3, the information to be transmitted from the serial communication unit 57 to the lens driver IC 13 is shown in chronological order from left to right in the drawing.

At the top, Start Condition, which is written as "S", is placed to indicate the start of an I2C communication from the serial communication unit 57.

Following "S", an address that is written as "SlaveAddr" and identifies the current communication target serving as the slave is placed to indicate that the destination of the transmission from the serial communication unit 57 is the lens driver IC 13 designated by "SlaveAddr", for example.

In "/W", which follows "SlaveAddr", a flag called Read/Write Condition is set to write information for issuing a write or read instruction from the serial communication unit 57 to the lens driver IC 13. In an I2C communication, information for issuing a write instruction is first communicated, and thereafter, the data to be transmitted is basically written into the register (not shown) of the lens driver IC 13.

"A", which follows "/W", indicates that the response from the lens driver IC 13 functioning as the slave is transmitted as ACK when a write instruction is confirmed.

In the 8-bit area that follows "A" on the left side, the serial communication unit 57 records information indicating, other than the DAC code, such as an operation mode.

In the stage after the 8-bit area in which the information other than the DAC code is recorded, a DAC code field consisting of 10-bit data D9 through D0 is formed so that the DAC code is transmitted. It should be noted that, when eight of the 10 bits of the DAC code are transmitted, ACK, which is represented by "A", is transmitted from the lens driver IC 13. Then, after that, the remaining two bits of the DAC code are transmitted.

Following the 10-bit DAC code, 6-bit information other than the DAC code, such as an operation mode, is transmitted.

After that, ACK, which is represented by "A", is transmitted from the lens driver IC 13, and lastly, Stop Condition represented by "P" is transmitted.

That is, the DAC code is transmitted as the 10-bit data D9 through D0 in the DAC code field, the data D9 of the DAC code is the MSB position, and the data D0 is the LSB position. As the MSB position and the LSB position are identified, it becomes possible to identify the position of the DAC code.

<Presetting of the Communication Format of the Lens Driver IC>

Figure 4:
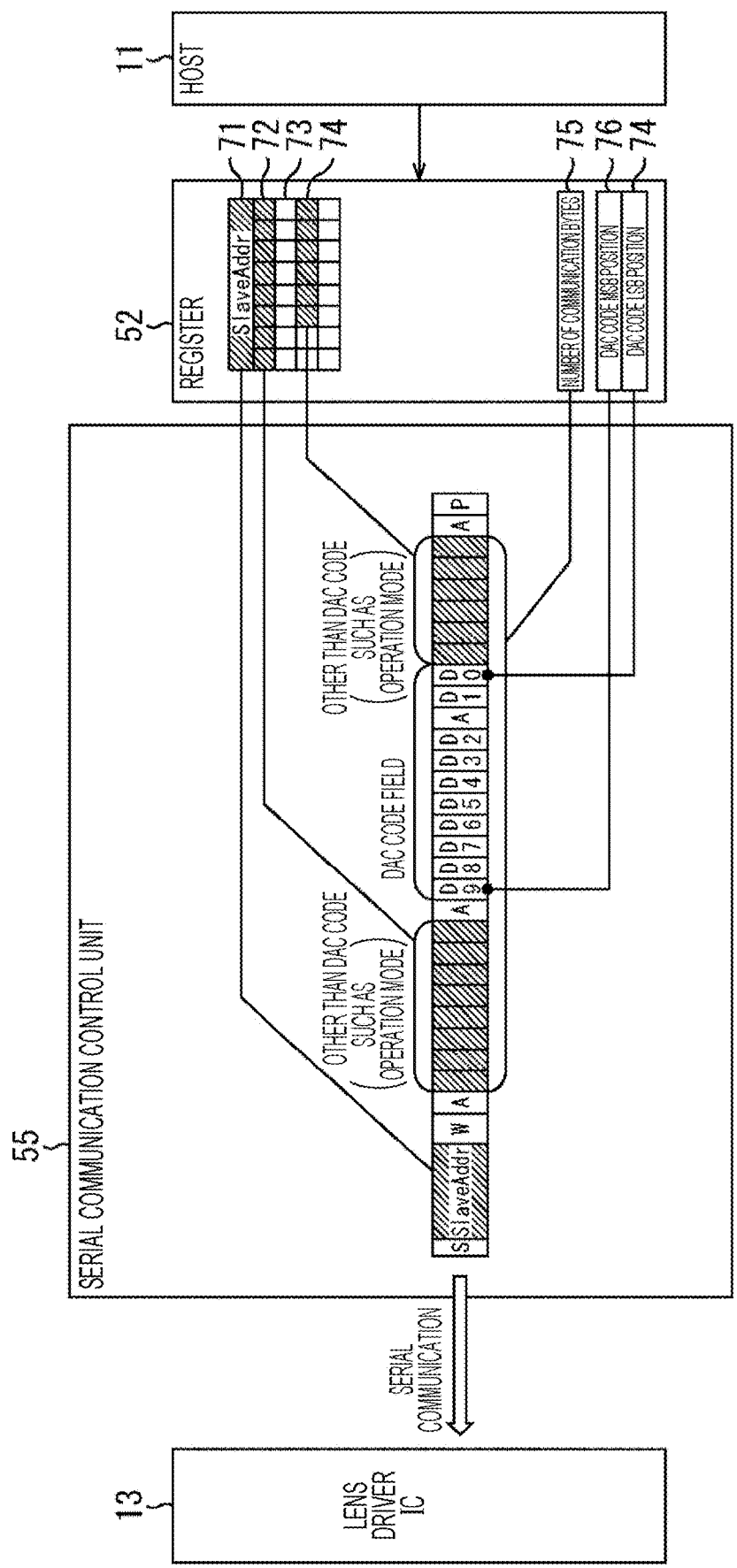
FIG. 4 is a diagram for explaining an example of presetting of the format for transmitting a DAC code through a serial communication.

Referring now to FIG. 4, presetting of the communication format of the lens driver IC is described.

In the communication format described above with reference to FIG. 3, the values in the DAC code field are the portion in which the value (DAC code) varies with each AF control unit during AF control operations.

The other portions such as the register address and the operation mode in the lens driver IC, including the slave address (SlaveAddr), are the portions in which values do not vary during the series of AF control operations.

As a method of presetting the communication format, register areas that have one-to-one correspondence with respect to the format are set in the register 52.

For example, as shown in FIG. 4, the last six bits (the right six bits in the drawing) of each of areas 71, 72, and 74 include data other than the slave address (SlaveAddr) and the DAC code, and set values of the portions that do not vary during the AF control operations are set in the last six bits by the host 11.

Further, the first two bits of each of the areas 73 and 74 are the register areas corresponding to the DAC code field. Any values may be set in the two bits, and therefore, there is no need to set any particular values.

Further, an area 75 is set as the area in which the number of communication bytes is set, and the total number of bytes in the communication format is set. Through the information in the area 75, the serial communication control unit can recognize the number of bytes to be communicated.

Meanwhile, to indicate from which bit position to which bit position the DAC code field extends in the communication format, the DAC code MSB position and the DAC code LSB position are set in areas 76 and 77, respectively, so that the bit positions can be set in the format.

With this arrangement, the information generation unit 55a of the serial communication control unit 55 can recognize in which area the DAC code output from the autofocus control unit 53 should be set in the format, in accordance with the information in the areas 71 through 77 in the register 52 at a time of an AF operation. Accordingly, it is possible to set the DAC code in a total of 10 bits of the first two bits of each of the corresponding areas 73 and 74. It should be noted that each of the areas 71 through 77 in FIG. 4 is a unit of eight bits arranged in a horizontal direction, but may be a unit of less than or more than eight bits.

In this manner, the portions other than the value of the DAC code in the communication format can be preset in accordance with the communication format unique to the lens driver IC 13. Thus, transmission can be conducted as shown in FIG. 5 in a case where three DAC codes [1] through [3] are transmitted, for example.

Figure 5:
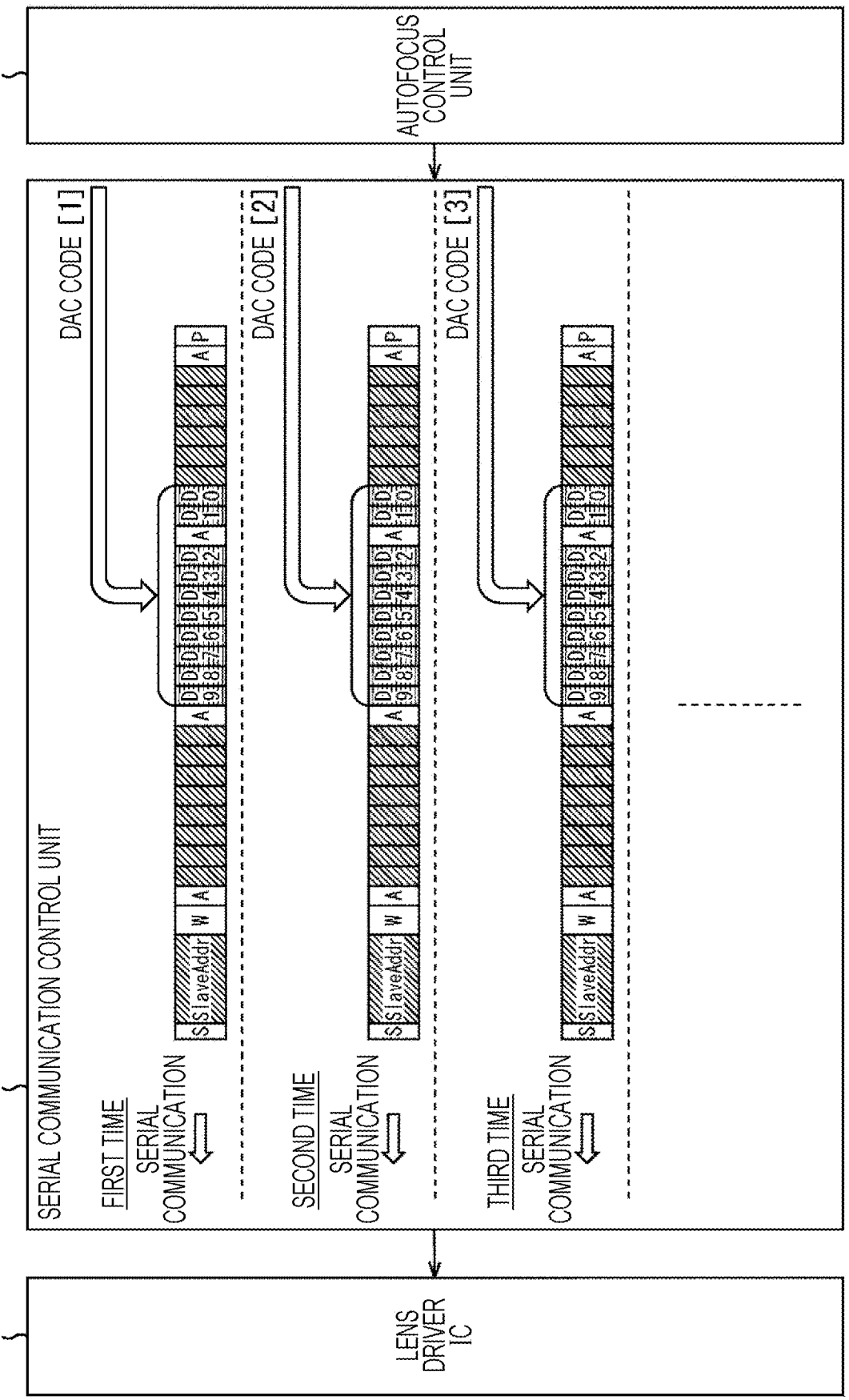
FIG. 5 is a diagram for explaining DAC code transmission using a preset format.

Specifically, the first DAC code [1] is transmitted as the data D9 through D0 in the DAC code field in the uppermost row in FIG. 5, the second DAC code [2] is transmitted as the data D9 through D0 in the DAC code field in the middle row in FIG. 5, and the third DAC code [3] is transmitted as the data D9 through D0 in the DAC code field in the lower row in FIG. 5.

Meanwhile, other than the data in the DAC code field, the information in the areas other than the first two bits of the areas 73 and 74 of the areas 71 through 77 in the register 52 in FIG. 5 is read and repeatedly transmitted. The data D9 through D0 in the DAC code field is buried in the positions of the first two bits of the areas 73 and 74, and is sequentially transmitted.

Example Configuration of a Busy Status Check Communication Format

Figure 6:
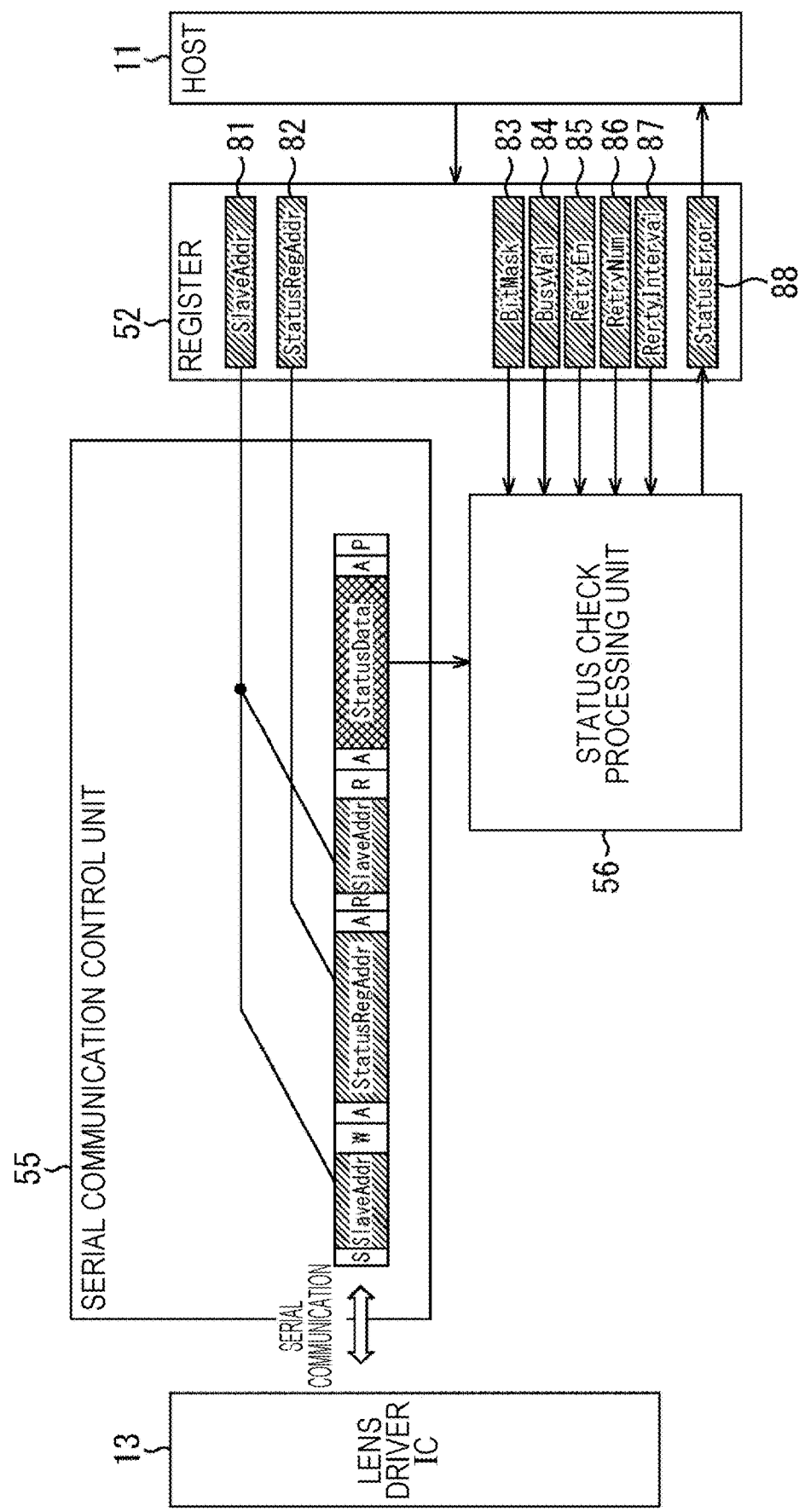
FIG. 6 is a diagram for explaining the format to be used when status information is requested through a serial communication.

Referring now to FIG. 6, an example configuration of a Busy status check communication format is described.

As for the format data serial transmission to the lens driver IC 13 to be performed for each AF control unit as described above with reference to FIG. 5, there are cases where it is necessary to check whether the lens driver IC is "Busy" (whether a DAC code can be transmitted), before a DAC code is transmitted, depending on the type of the lens driver IC 13.

To cope with various types of lens driver ICs 13 in a universal manner, it is desirable to be able to cope with such cases.

Therefore, before the DAC code transmission shown in FIG. 4, Busy status data stored in a register (not shown) on the side of the lens driver IC 13 is read, and a check is made to determine whether a DAC code can be transmitted. Referring to FIG. 5, an example configuration of the communication format for the check is described.

The communication format in FIG. 5 forms the format for reading a Busy status register of the lens driver IC in I2C communications.

Since the necessary information is the address of the Busy status register of the lens driver IC 13, an area 82 for setting the address is provided in the register 52. In accordance with the address set in the area 82, the address of the Busy status register of the lens driver IC 13 is set.

It should be noted that an area 81 for setting a slave address (SlaveAddr) that is the information required at the same time may be the same as that in the presetting of the area 71 in FIG. 4.

Further, after data (StatusData) is read from the Busy status register (not shown) of the lens driver IC 13, the status check processing unit 56 also checks, from the data (StatusData), whether the lens driver IC 13 is "Busy" (whether a DAC code can be transmitted).

That is, the information generation unit 55a of the serial communication control unit 55 reads the Busy status register in accordance with the format shown in the center of the drawing.

Specifically, at the top, Start Condition, which is written as "S", is set to indicate the start of an I2C communication from the serial communication unit 57.

Following "S", an address that is written as "SlaveAddr" and identifies the current communication target serving as the slave is placed to indicate that the destination of the transmission from the serial communication unit 57 is the lens driver IC 13 designated by "SlaveAddr", for example.

In "W", which follows "SlaveAddr", a flag called Write/Read Condition is set to write information for issuing a read or write instruction from the serial communication unit 57 to the lens driver IC 13. Particularly, in "W", information for issuing a write instruction is written. In an I2C communication, information for issuing a write instruction is first communicated, and thereafter, the data to be transmitted is basically written into the register (not shown) of the lens driver IC 13.

In "A", which follows "W", the response from the lens driver IC 13 functioning as the slave is transmitted as ACK when a write instruction is confirmed.

In the area after "A", "StatusRegAddr" is set, and the information that is stored in the area 82 of the register 52 and is for issuing an instruction as to writing at the address of the Busy status register (not shown) of the lens driver IC 13 is transmitted.

In "A", which follows "StatusRegAddr", the response obtained when the lens driver IC 13 functioning as the slave is confirmed to be capable of writing in the Busy status register (not shown) is transmitted as ACK.

In "R", which follows "A", Repeated Start Condition is set, and Start Condition remains to be set therein, to designate an operation at the slave address to be designated thereafter.

Following "R", an address that is written as "SlaveAddr" and identifies the current communication target serving as the slave is placed to indicate that the destination of the transmission from the serial communication unit 57 is still the lens driver IC 13 designated by "SlaveAddr".

"R", which follows "SlaveAddr", is a Read/Write flag for the information written at the address of the Busy status register (not shown), and "R" particularly indicates that there is an instruction to read the information.

It should be noted that "R" is written both before and after the second "SlaveAddr" in FIG. 6, but the instructions differ from each other.

In "A", which follows the second "R", the response obtained when the lens driver IC 13 functioning as the slave is confirmed to be capable of reading the Busy status register (not shown) is transmitted as ACK.

"StatusData", which follows "A", indicates that the lens driver IC 13 is transmitting status data (StatusData) read from the address of the Busy status register (not shown).

After "StatusData", ACK, which is represented by "A", is transmitted from the lens driver IC 13, and lastly, Stop Condition represented by "P" is transmitted.

Specifically, the information about the Busy status register of the lens driver IC 13 is read as the information included in the area indicated by "StatusData" in FIG. 6, and is output to the status check processing unit 56. Through this process, the status check processing unit 56 becomes capable of determining whether the lens driver IC 13 is "Busy".

At this stage, the data described below is further required. Therefore, the data described below is preferably also preset in a predetermined area in the register 52.

Specifically, a bit mask (BitMask) for extracting only the Busy status bit field indicating a Busy status is required for the read status data (StatusData), and therefore, an area 83 in which the bit mask is stored is first set as shown in FIG. 6, for example.

Further, an area 84 in which a Busy status bit field value (BusyVal) calculated from the status data (StatusData) with the use of the bit mask (BitMask) is set.

Here, the Busy status bit field value (BusyVal) is calculated by applying the bit mask (BitMask) to the data (StatusData). Therefore, the Busy status bit field value (BusyVal) is expressed by the equation shown below.

$$\text{StatusData \& BitMask} = \text{BusyVal}$$

The status check processing unit 56 can determine whether the lens driver IC 13 is "Busy", in accordance with the Busy status bit field value (BusyVal).

If the lens driver IC 13 is determined not to be "Busy", the communication control unit 55b of the serial communication control unit 55 transmits transmission information in which a DAC code is buried.

Further, if the lens driver IC 13 is determined to be "Busy", on the other hand, a setting indicating whether to retry is set in advance, and the setting is set as RetryEn in an area 85 in the register 52 shown in FIG. 6, for example.

If the value of RetryEn indicates that a setting for a retry has been set, the number of times a retry is to be performed, and the intervals (the time intervals at which a retry is repeated) are set as RetryNum and RetryInterval as shown in areas 86 and 87, respectively, in the register 52 in FIG. 6.

With this retry setting, a DAC code is transmitted when the lens driver IC 13 stops being Busy while a retry is repeated the predetermined number of times at the predetermined time intervals. If the lens driver IC 13 stays Busy, an error notification is transmitted, and this situation is recorded as error information (StatusError) as shown in an area 88 in the register 52 in FIG. 6. Reading the error information, the host 11 recognizes the error.

<Drive Types of Actuators and Offsetting of a DAC Code>

Actuators are generally classified into a unidirectionally-driven type and a bidirectionally-driven type.

Figure 7:
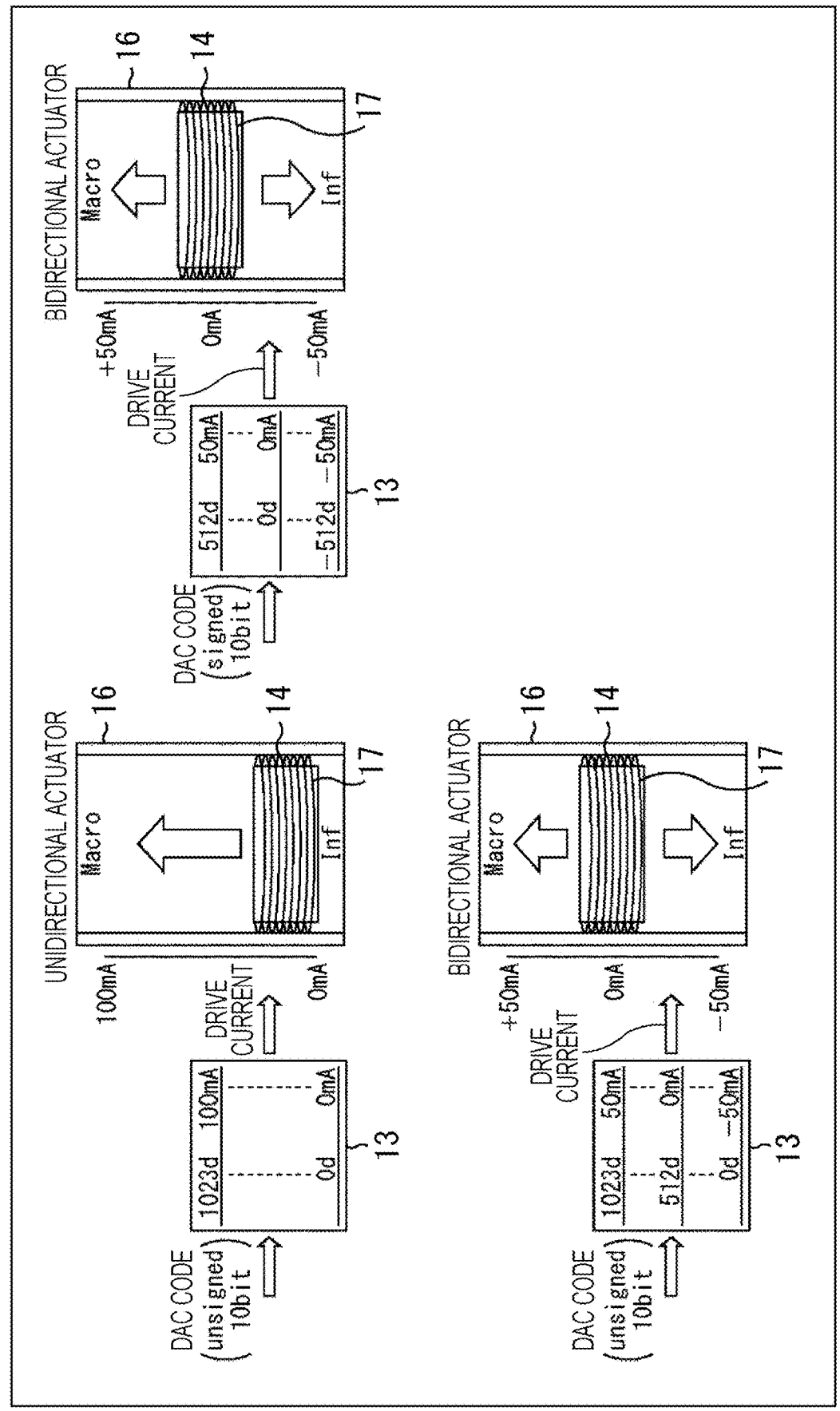
FIG. 7 is a diagram for explaining actuator drive types.

As shown in the upper left portion of FIG. 7, for example, a unidirectionally-driven actuator is located at the Inf end of the lens 17 when the drive current is 0 A, and moves toward the Macro end as the drive current increases.

It should be noted that, in the upper left portion of FIG. 7, the left portion is a DAC code, the central portion indicates the current value corresponding to the DAC code in the lens driver IC 13, and the right portion indicates the position of the lens 17 in the lens tube 16 in accordance with the operation of the actuator 14 corresponding to the current value. It should be noted that the downward direction of the position of the lens 17 in the lens tube 16 in the drawing is the Inf direction, and the upward direction is the Macro direction.

That is, in the unidirectionally-driven type, the actuator 14 operates in proportion to the DAC code, and, like the operation of the actuator 14, the lens 17 also moves in the Macro direction in accordance with the DAC code. Specifically, in a case where the DAC code varies from 0d to 1023d (here, "d" indicates a decimal number), and the corresponding current value is 0 to 100 mA, the current value is 0 mA when the DAC code is 0d, and the current value is 100 mA when the DAC code is 1023d.

As shown in the lower left portion of FIG. 7, on the other hand, a bidirectionally-driven actuator is located in the middle portion when the drive current is 0 A. The bidirectionally-driven actuator moves toward the Macro end when the drive current is applied in a certain direction, and moves toward the Inf end when the drive current is applied in the reverse direction. Specifically, in a case where the DAC code varies from 0d to 1023d (here, "d" indicates a decimal number), and the corresponding current value is −50 to +50 mA, the current value is −50 mA when the DAC code is 0d, the current value is 0 mA when the DAC code is 512d, and the current value is +50 mA when the DAC code is 1023d.

Further, the lens driver ICs 13 that drive bidirectionally-driven actuators are classified into an unsigned DAC code type and a signed DAC code type.

As shown in the upper left portion and the lower left portion of FIG. 7, an unsigned DAC code type associates the entire drive current range with positive code values.

As shown in the upper right portion of FIG. 7, however, a signed DAC code type associates the direction of the drive current with positive and negative code values. Specifically, in a case where the DAC code varies from −512d to +511d (here, "d" indicates a decimal number), and the corresponding current value is −50 to +50 mA, the current value is −50 mA when the DAC code is −512d, the current value is 0 mA when the DAC code is 0d, and the current value is +50 mA when the DAC code is +511d.

When the value of a DAC code output from the autofocus control unit 53 is transmitted to the lens driver IC 13, it might be necessary to convert the value into the corresponding DAC code value, depending on the type of the lens driver IC 13.

Figure 8:
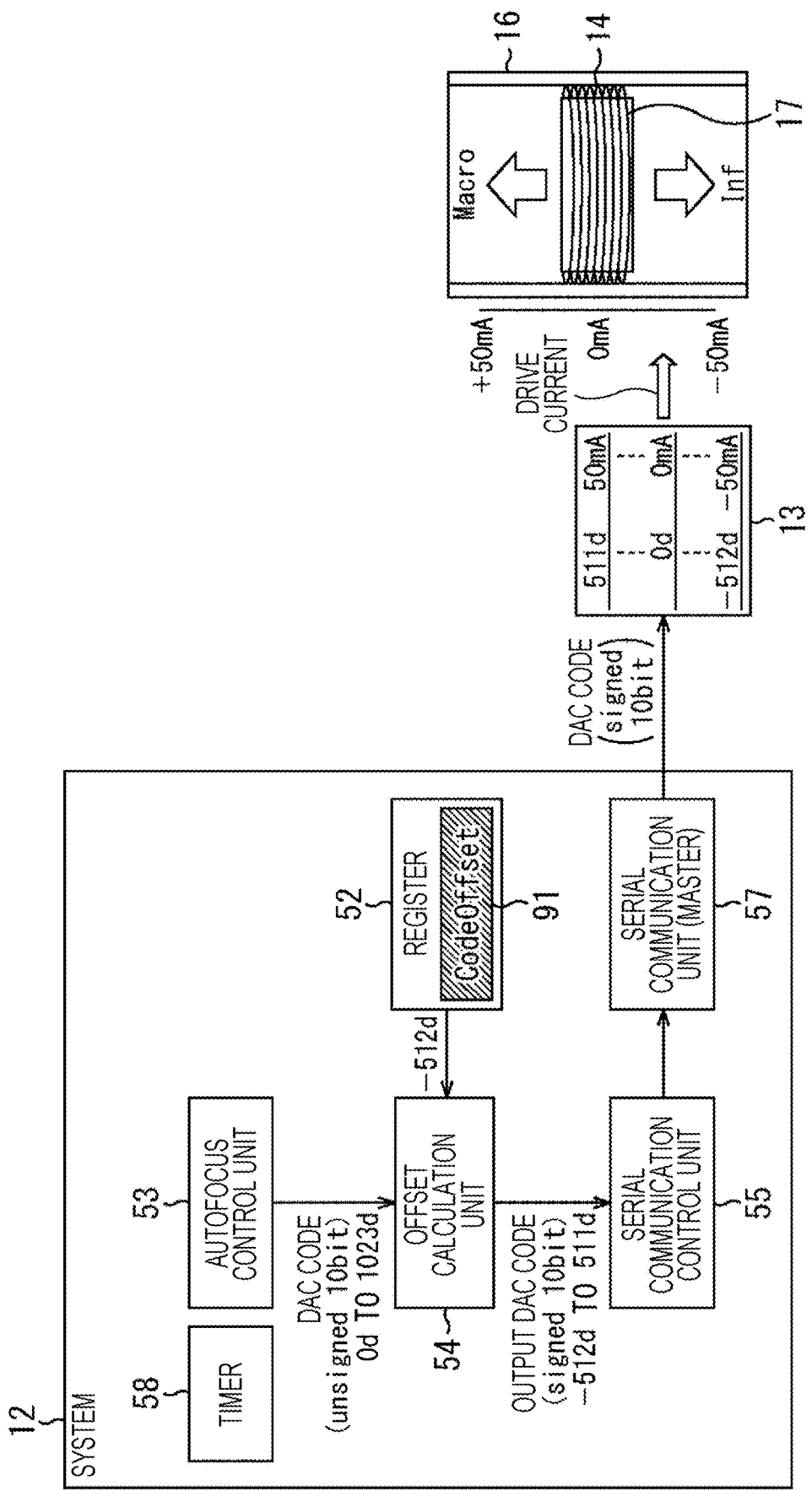
FIG. 8 is a diagram for explaining an example in which an offset is calculated in accordance with an actuator drive type.

The offset calculation unit 54 converts the value of a DAC code by offsetting as above. That is, as shown in FIG. 8, an area 91 in which the difference (offset: CodeOffset) between the range of DAC code values to be output from the autofocus control unit 53 and the range of DAC code values of the connected lens driver ICs 13 is provided in the register 52. To cope with this, the offset calculation unit 54 performs a calculation process of adding (subtracting) an offset value set in the area 91 to (from) the value of a DAC code output from the autofocus control unit 53.

Specifically, in a case where the range of DAC code values to be output from the autofocus control unit 53 is unsigned or 0d to 1023d as shown in FIG. 8, while the connected lens driver IC 13 is of the signed DAC code type shown in the upper right portion of FIG. 7 and the range of DAC code values is signed or −512d to 511d, a code offset (CodeOffset) for setting an offset is provided in the area 91 in the register 52, and −512d is set as the value.

The offset calculation unit 54 mounted in the autofocus drive control unit 12 can appropriately offset the value of a DAC code output from the autofocus control unit 53, by subtracting 512d from the value of the DAC code and supplying the resultant value as a DAC code value to the lens driver IC 13.

<Lens Control Process>

Figure 9:
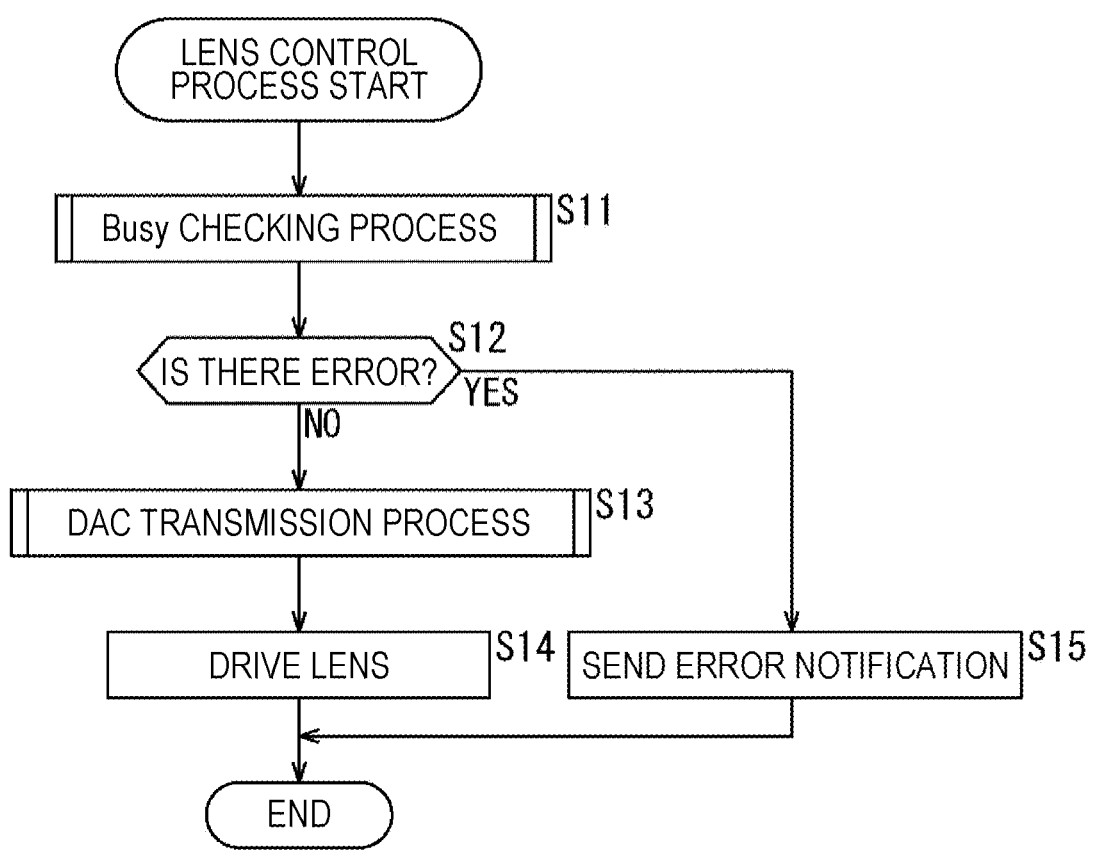
FIG. 9 is a flowchart for explaining a lens control process to be performed by the imaging apparatus shown in FIG. 1.

Referring now to the flowchart in FIG. 9, a lens control process in the imaging apparatus shown in FIG. 1 is described. It should be noted that, before this process is performed, the host 11 performs a preset process in advance, to set a communication format in the areas 71 through 77 in the register 52 of the AF drive control unit 12, a communication format required in checking a Busy status in the areas 81 through 88, and an offset in the area 91.

It should be noted that this preset process may be performed by inputting the corresponding values to the lens driver IC 13 separately from one another, or storing values highly likely to be input as options and inputting values selected from among the options.

Also, a series of lens control processes is started when the host 11 instructs the AF drive control unit 12 to perform a lens control process.

In step S11, the serial communication control unit 55 performs a Busy checking process, to check the status indicating whether the lens driver IC 13 is in a Busy state.

<Busy Checking Process>

Figure 10:
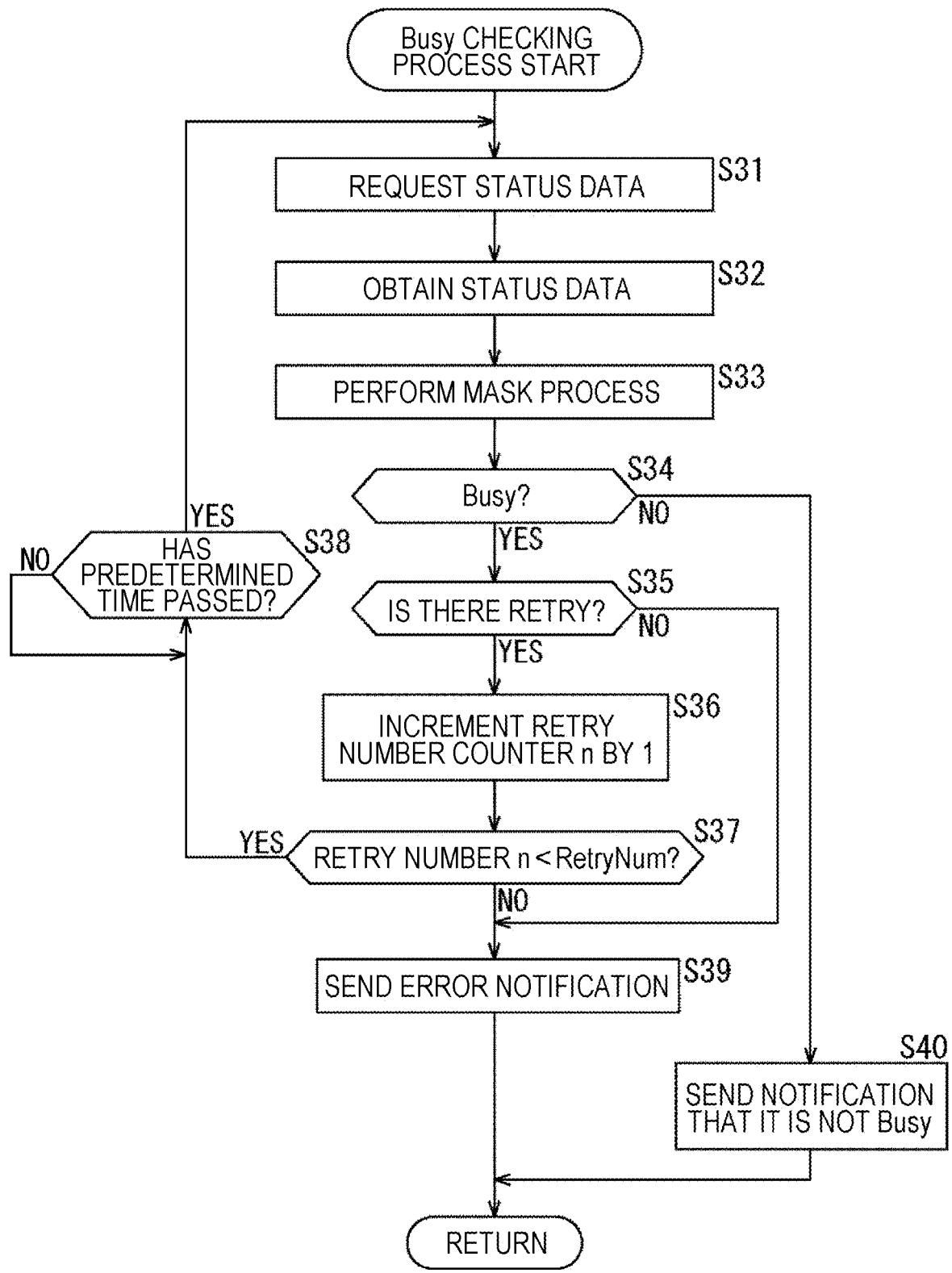
FIG. 10 is a flowchart for explaining the Busy checking process shown in FIG. 9.

Referring now to the flowchart in FIG. 10, the Busy checking process is described.

In step S31, the information generation unit 55a of the serial communication control unit 55 controls the serial communication unit 57, to generate transmission information for requesting status data in the communication format shown in FIG. 6 from the lens driver IC 13, and the communication control unit 55b controls the serial communication unit 57 to cause the lens driver IC 13 to transmit the status data. More specifically, the information generation unit 55a of the serial communication control unit 55 reads the slave address (SlaveAddr) and the address (StatusRegAddr) of the Busy status register from the areas 81 and 82 in the register 52, and thus generates the communication format shown in FIG. 6. The communication control unit 55b then controls the serial communication unit 57, to request status data from the lens driver IC 13.

In response to this request, the lens driver IC 13 recognizes, from the slave address (SlaveAddr), that the request is directed to the lens driver IC 13. In accordance with the address (StatusRegAddr) of the Busy status register, the lens driver IC 13 also reads status data (StatusData), and transmits the status data to the AF drive control unit 12.

In step S32, the communication control unit 55b of the serial communication control unit 55 controls the serial communication unit 57, to obtain the transmitted status data (StatusData) and supply the status data to the status check processing unit 56.

In step S33, the status check processing unit 56 reads the information about the bit mask (BitMask) from the area 83 in the register 52, and performs a mask process on the obtained status data (StatusData), to extract only the Busy status bit field indicating a Busy status and store the Busy status bit field as BusyVal into the area 84.

In step S34, the status check processing unit 56 determines whether the lens driver IC 13 is "Busy", in accordance with the BusyVal information that is stored in the area 84 and indicates a Busy status.

In a case where the lens driver IC 13 is determined to be "Busy", for example, and transmission of a DAC code is regarded as difficult in step S34, the process moves on to step S35.

In step S35, the status check processing unit 56 reads the RetryEn information stored in the area 85 in the register 52, and determines whether a retry setting for re-checking a Busy status has been set. In a case where a retry setting is determined to have been set in step S35, the process moves on to step S36.

In step S36, the status check processing unit 56 increments, by 1, a counter n that counts the number of retries.

In step S37, the status check processing unit 56 reads the number of times RetryNum stored in the area 86 in the register 52, and determines whether the value of the counter n is smaller than the number of times RetryNum that is set as the number of retries. In a case where the value of the counter n is smaller than the number of times RetryNum set as the number of retries in step S37, for example, and therefore, there is a need to perform a retry, the process moves on to step S38.

In step S38, the status check processing unit 56 reads the retry time interval RetryInterval stored in the area 87 in the register 52, and controls the timer 58 to count a predetermined time equivalent to the time interval RetryInterval. The status check processing unit 56 then determines whether the predetermined time has passed, and repeats a similar process until the predetermined time has passed. Then, in a case where the predetermined time has passed in step S38, the process returns to step S31, and a retry is started.

Procedures in steps S31 through S38 are then repeated. In a case where the value of the counter n is greater than the number of times RetryNum set as the number of retries, for example, and it is determined in step S37 that there is no need to perform any more retry, the process moves on to step S39.

In step S39, the status check processing unit 56 records an error as StatusError in the area 88 in the register 52, and also records information to be sent to the serial communication control unit 55.

In a case where it is determined in step S35 that there is no retry setting, on the other hand, the process moves on to step S39, and an error occurrence notification is promptly reported.

Further, in a case where the lens driver IC 13 is determined not to be "Busy" in step S34, the status check processing unit 56 in step S40 notifies the serial communication control unit 55 that the lens driver IC 13 is not "Busy".

That is, through this Busy checking process, a check is made to determine whether the lens driver IC 13 can receive a DAC code.

Explanation now returns to the flowchart in FIG. 8.

Through the process in step S11, a check is made to determine whether the lens driver IC 13 can receive a DAC code.

In step S12, the serial communication control unit 55 then determines whether there is an error while the lens driver IC 13 is "Busy". In a case where there is not an error in step S12, for example, the process moves on to step S13.

In step S13, the serial communication control unit 55 performs a DAC code transmission process, to transmit a DAC code to the lens driver IC 13.

<DAC Code Transmission Process>

Figure 11:
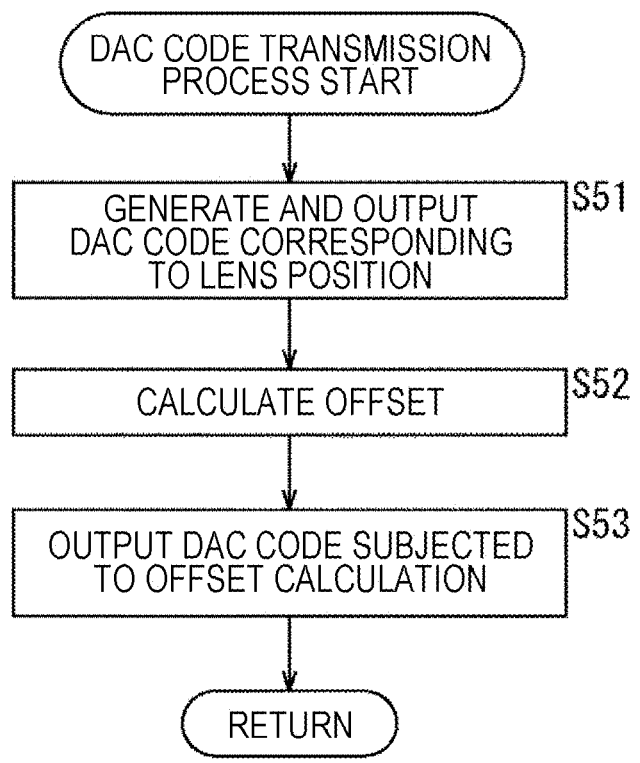
FIG. 11 is a flowchart for explaining the DAC code transmission process shown in FIG. 9.

Referring now to the flowchart in FIG. 11, the DAC code transmission process is described.

In step S51, from the position of the lens 17 and an image captured by the imaging device 15, the autofocus control unit 53 generates a DAC code for driving the actuator 14 to move the lens 17 to an appropriate position, and supplies the DAC code to the offset calculation unit 54.

In step S52, the offset calculation unit 54 reads the code offset (CodeOffset) stored in the area 91 in the register 52, and performs a calculation to add (subtract) the offset to (from) the supplied DAC code, to correct the DAC code. The offset calculation unit 54 then supplies the DAC code to the serial communication control unit 55.

In step S53, the information generation unit 55a of the serial communication control unit 55 reads the communication format that is stored in the areas 71 through 74 in the register 52 and is to be used in transmission of the DAC code. The information generation unit 55a then buries the corrected DAC code in the DAC code field, and outputs the DAC code to the serial communication unit 57.

Through the above process, it becomes possible to transmit an appropriately corrected DAC code to the lens driver IC 13 when the lens driver IC 13 is not "Busy".

Explanation now returns to the flowchart in FIG. 8.

In step S14, the communication control unit 55b of the serial communication control unit 55 controls the serial communication unit 57 to transmit the transmission information that has the corrected DAC code buried therein and is required in transmission of the DAC code, to the lens driver IC 13. The lens driver IC 13 extracts the DAC code from the communication format, and drives the actuator 14 in accordance with the extracted DAC code. By doing so, the lens driver IC 13 moves the lens 17 to an appropriate position.

In a case where it is determined in step S12 that there is an error, on the other hand, the communication control unit 55b of the serial communication control unit 55 suspends the transmission of the DAC code. As the StatusError information stored in the area 88 in the register 52 is supplied from the serial communication unit 51 to the host 11, the host 11 is notified that an error has occurred during the lens control process.

Through the above process, the communication format required in transmission through a serial communication is preset in the register 52. Thus, it becomes possible to sequentially transmit varying DAC codes to the lens driver IC 13 simply by burying each DAC code in the communication format.

The data to be invariably input to the communication format for each lens driver IC 13 is also preset together with the communication format beforehand, so that a serial communication can be conducted simply by burying varying DAC codes.

Further, the information that varies with the specifications of lens driver ICs 13 and is to be invariably input to the communication format is simply preset in accordance with the specification of each lens driver IC 13, so that DAC codes can be transmitted. As a result, the IC in which the AF lens drive control unit is mounted is made compatible with various communication specifications that vary with the types of lens driver ICs 13 to be connected thereto. In this case, the information to be preset varies with lens driver ICs, but there is no need to update the firmware and the like.

For the above reason, the firmware and the like that need to be updated every time connected lens driver ICs 13 are changed are not updated, and information presetting is enough in connecting lens driver ICs 13 of different specifications to the IC in which the AF lens drive control unit is mounted.

<Timing Chart for Explaining Communication Between a Lens Driver IC and the Serial Communication Unit 57 as an I2C Master>

Figure 12:
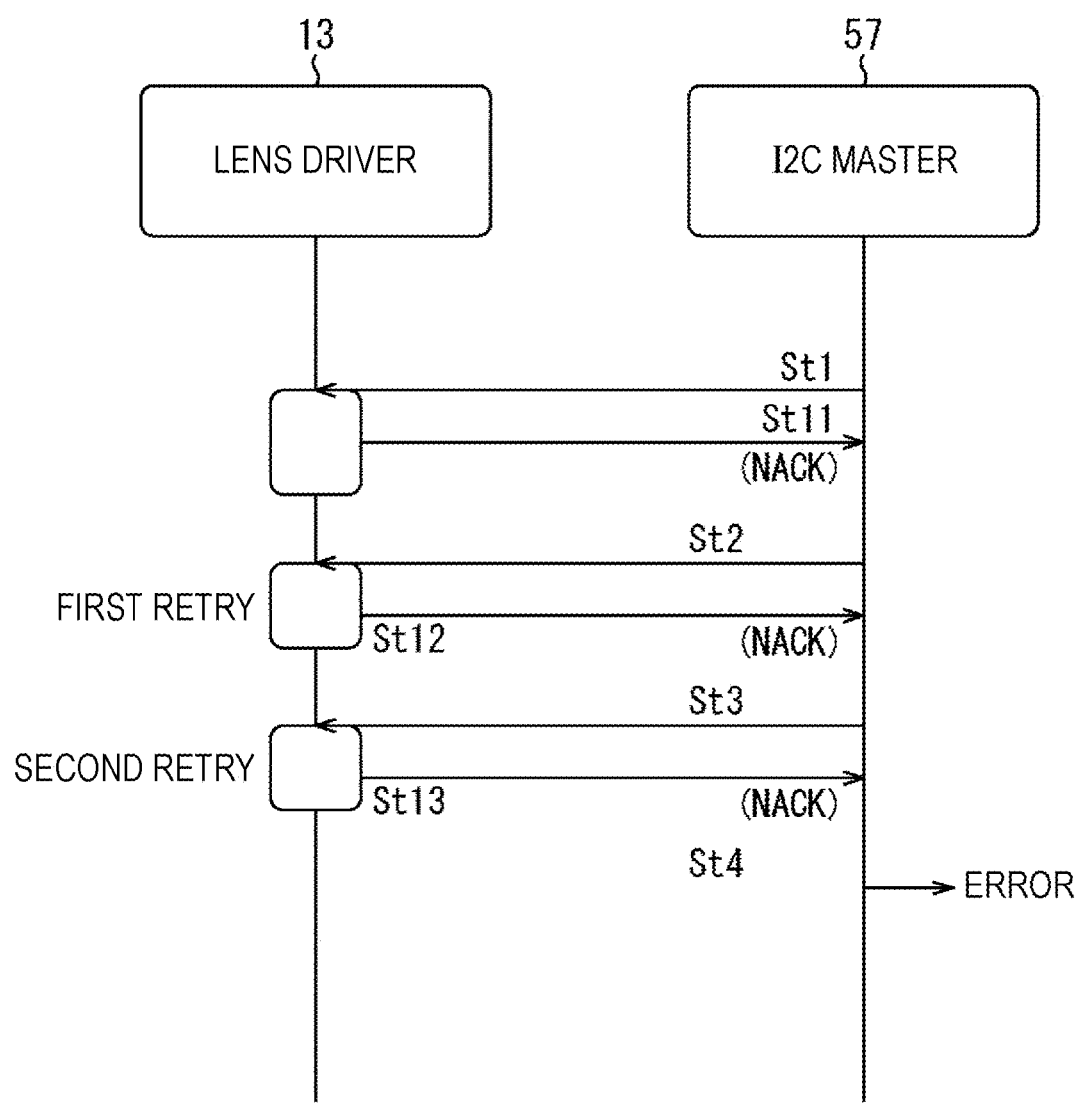
FIG. 12 is a timing chart in a case where a process ends with an error in a lens control process.

In a case where the retry number RetryNum is two, and communication cannot be conducted due to an error, for example, communication between the lens driver IC 13 and the serial communication unit 57 as an I2C Master in the above described process is like the operations shown in the timing chart in FIG. 12.

It should be noted that FIG. 12 is a timing chart that shows the operation of the lens driver IC 13 on the left side in the chart, and the operation of the serial communication unit 57 functioning as the master in I2C communications on the right side in the chart.

Specifically, at timing St1, the serial communication unit 57 functioning as the master in I2C communications is controlled by the communication control unit 55*b* of the serial communication control unit 55, and requests Busy status information through a Busy checking process.

In response to this, the Busy status information is supplied from the lens driver IC 13 at timing St11. In a case where the lens driver IC 13 is "Busy", or where NACK is supplied, the serial communication unit 57 performs a first retry at timing St2.

In response to this, the Busy status information is supplied from the lens driver IC 13 at timing St12. In a case where the lens driver IC 13 is "Busy" for the second time, or where second NACK is supplied, the serial communication unit 57 performs a second retry at timing St3.

In response to this, the Busy status information is supplied from the lens driver IC 13 at timing St13. In a case where the lens driver IC 13 is "Busy" for the third time, or where third NACK is supplied, the serial communication control unit 55 notifies the host 11 of an error at timing St4.

As described above, two retries are performed for the first error, and, if an error still occurs in the communication with the lens driver IC 13, a notification that a DAC code cannot be transmitted due to an error is transmitted. With this, the DAC code transmission process comes to an end.

<Timing Chart for Explaining Operations in the AF Drive Control Unit>

Figure 13:
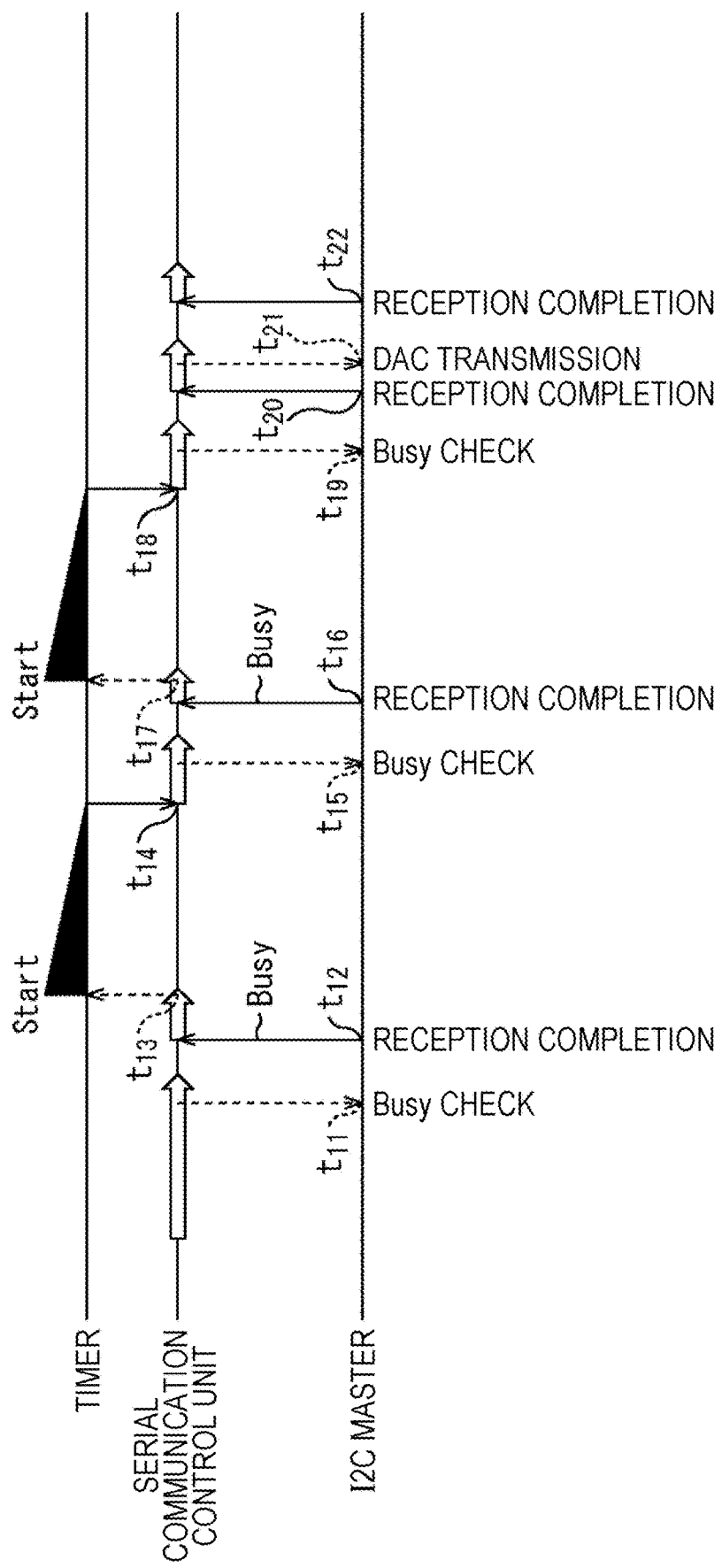
FIG. 13 is a timing chart in a case where lens control is performed after a second retry in a lens control process.

In a case where communication finally becomes possible after a second retry, the operations in the AF drive control unit 12 are like the processes shown in the timing chart in FIG. 13.

It should be noted that the timing chart in FIG. 13 shows, from the top, the operation of the counter of the timer 58, and the operations of the serial communication control unit and the serial communication unit 57 that functions as the master in I2C communications.

At time t11, the communication control unit 55*b* of the serial communication control unit 55 instructs the serial communication unit 57 to request status data (to make a Busy check) from the lens driver IC 13. In response to this, at time t12, the status data is received, and is then supplied to the serial communication control unit 55 (reception completion).

In a case where there is an error at this point of time, the status check processing unit 56 controls the timer 58 at time t13, and waits until a predetermined time passes before the next retry.

Then, at time t15 after time t14 at which the predetermined time has passed, the status check processing unit 56 instructs the serial communication control unit 55 to request status data and a first retry (to make a Busy check) from the lens driver IC 13. In response to this, at time t16, the status data is received, and is then supplied to the serial communication control unit 55 (reception completion).

In a case where there is an error again at this point of time, the status check processing unit 56 controls the timer 58 at time t17, and waits until the predetermined time passes before the next retry.

Then, at time t19 after time t18 at which the predetermined time has passed, the status check processing unit 56 instructs the serial communication control unit 55 to request status data and a second retry (to make a Busy check) from the lens driver IC 13. In response to this, at time t20, the status data is received, and is then supplied to the serial communication control unit 55 (reception completion).

In a case where there is not an error at this point of time, the information generation unit 55*a* of the serial communication control unit 55 generates transmission information by burying a DAC code in the communication format at time t21. The DAC code is corrected by the offset calculation unit 54 offsetting a DAC code supplied from the autofocus control unit 53. The communication control unit 55*b* then controls the serial communication unit 57, to transmit the transmission information to the lens driver IC 13.

At time t22, the serial communication unit 57 transmits a notification of DAC code transmission completion to the serial communication control unit 55, and the process then comes to an end.

In a case where DAC code transmission is completed after a second retry as in the above described process, the DAC code is appropriately supplied to the lens driver IC 13, so that the lens can be appropriately controlled.

The communication formats that are required in transmitting a DAC code and in checking a Busy status can also be stored in the register 52 through a preset process in accordance with the specification of the lens driver IC 13. Thus, there is no need to update the firmware or the like, and preset processes are simply switched to cope with lens driver ICs 13 having different specifications.

Further, an offset can be set (preset). Accordingly, an offset can be set in accordance with the DAC code specification of each lens driver IC 13. Thus, there is no need to update the firmware or the like, and it becomes possible to cope with lens driver ICs 13 having different specifications.

Also, the communication formats required in transmitting a DAC code and in checking a Busy status, and offsets can be regarded as parameters that vary with the specifications of lens driver ICs 13, and therefore, the parameters stored in the register 52 are preset so that the offset calculation unit 54 and the serial communication control unit 55 can cope with lens driver ICs 13 having various specifications through processes corresponding to these parameters, without updating the firmware.

Further, although an example case where the AF drive control unit 12 in an imaging apparatus controls the lens driver IC 13 has been described above, effects that are similar to the above described effects can be achieved with a similar configuration in a serial communication between other devices, as long as the serial communication is between a control-side device that controls operations with DAC codes and a device on a non-control side.

Also, in the above described example, the serial communication control unit 55 buries a DAC code generated by the autofocus control unit 53 in the communication format that is stored in the register 52 and is to be used in transmitting a DAC code. The serial communication control unit 55 supplies the DAC code to the serial communication unit 57, and causes the serial communication unit 57 to transmit the DAC code to the lens driver IC 13.

However, a DAC code generated by the autofocus control unit 53 is buried in a communication format stored in the register 52 at any time before being transmitted to the lens driver IC 13 by the serial communication unit 57. Therefore, the process of burying a DAC code in a communication format may be performed by some other component provided between the autofocus control unit 53 and the serial communication unit 57.

In view of this, the autofocus control unit 53 may read a format stored in the register 52, generate a DAC code, and then bury the DAC code in the communication format, for example. The offset calculation unit 54 may read a communication format stored in the register 52, offset a DAC code, and then bury the DAC code in the communication format. A component for reading a communication format stored in the register 52 and burying a DAC code in the communication format may be provided between the autofocus control unit 53 and the serial communication unit 57.

<First Modification>

In the above described example, necessary information (parameters) is written into the areas 71 through 77, 81 through 88, and 91 in the register 52 through presetting, so that the above described lens control process is performed. However, for the information necessary in lens control, the areas 71 through 77, 81 through 88, and 91 in the register 52 may be set by some other method.

For example, the contents of the above described presetting may be prepared beforehand as program codes, and the program codes compiled and binarized by an external device may be loaded from the host 11 into the AF drive control unit 12.

Figure 14:
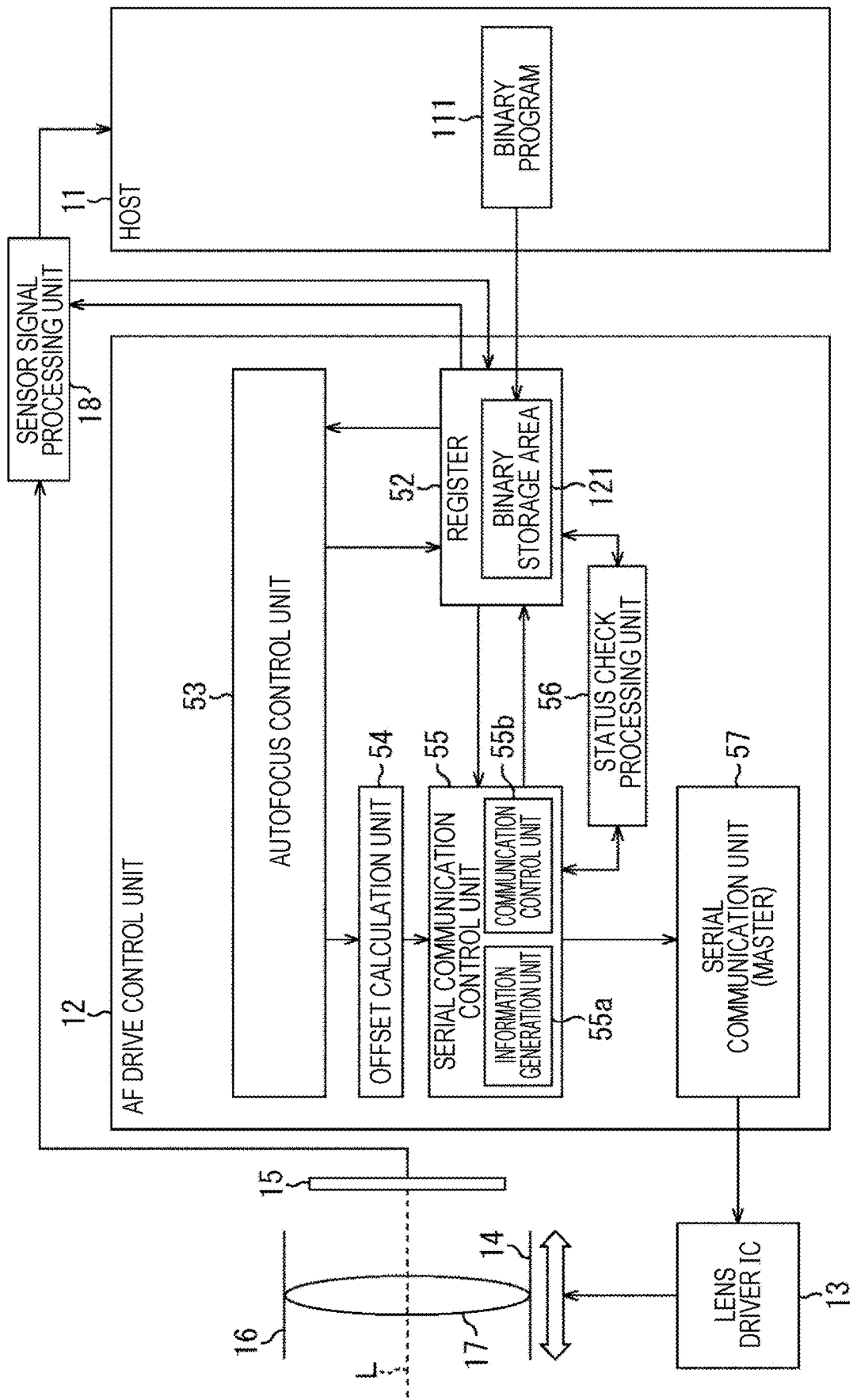
FIG. 14 is a diagram for explaining a first modification of an imaging apparatus to which the present technology is applied.

FIG. 14 shows an example configuration in a case where the contents of presetting are prepared beforehand as program codes, and the program codes compiled and binarized by an external device are loaded from the host 11 into the AF drive control unit 12. It should be noted that components having the same functions as those shown in FIG. 1 have the same names and the same reference numerals as those in FIG. 1, and explanation of them will not be made below.

Specifically, the configuration in FIG. 14 differs from the configuration in FIG. 1 in that a binary storage area 121 is provided in the register 52, and a binary program 111 obtained by compiling the above described areas 71 through 77, 81 through 88, and 91 in the register 52 is loaded from the host 11.

The means of loading the program may be a means of loading a program into a memory with an assigned address in the same manner as in the register setting through a serial communication that is mainly used for register setting. However, the means of loading the program may be some other means (a special loading means).

After that, the autofocus control unit 53 formed with a central processing unit (CPU) on the side of the AF drive control unit 12 may process the binary program 111, to complete the presetting.

<Second Modification>

Although the I2C communication method is used in the above described example, communication formats according to some other method may be used. For example, communication formats according to a serial peripheral interface (SPI) method may be used.

Figure 15:
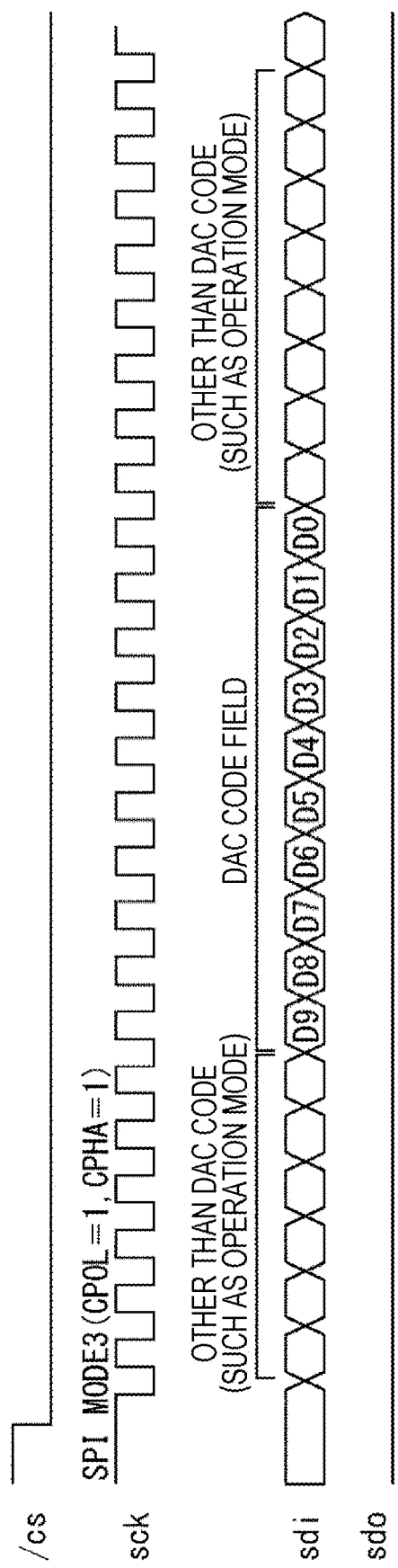
FIG. 15 is a diagram for explaining a second modification of an imaging apparatus to which the present technology is applied.

Specifically, communication formats according to the SPI method as shown in FIG. 15 may be used, for example. FIG. 15 shows, from the top, /CS (Chip Select), sck (Serial Clock) (SPI MODE3 (CPOL (Clock Polarity)=1, CPHA (Clock Phase)=1), sdi (Serial Data In), and sdo (Serial Data Out).

Specifically, when /CS is switched to Low, and the slave is designated, an operation of sck is started. Data is sequentially input by sdi, and information other than a DAC code, such as an operation mode, is transmitted to the first six bits. A DAC code field is formed in the next 10-bit data D9 through D0, and a DAC code is transmitted. Then, in the eight bits following the DAC code field, information other than a DAC code, such as an operation mode, is transmitted.

In this case, any slave address is not included, which differs from the I2C method. Therefore, it is not possible to identify more than one slave device and transmit data. However, data is transmitted only to a specific slave device, and accordingly, the data transmission can be performed at a higher speed.

<Third Modification>

Figure 16:
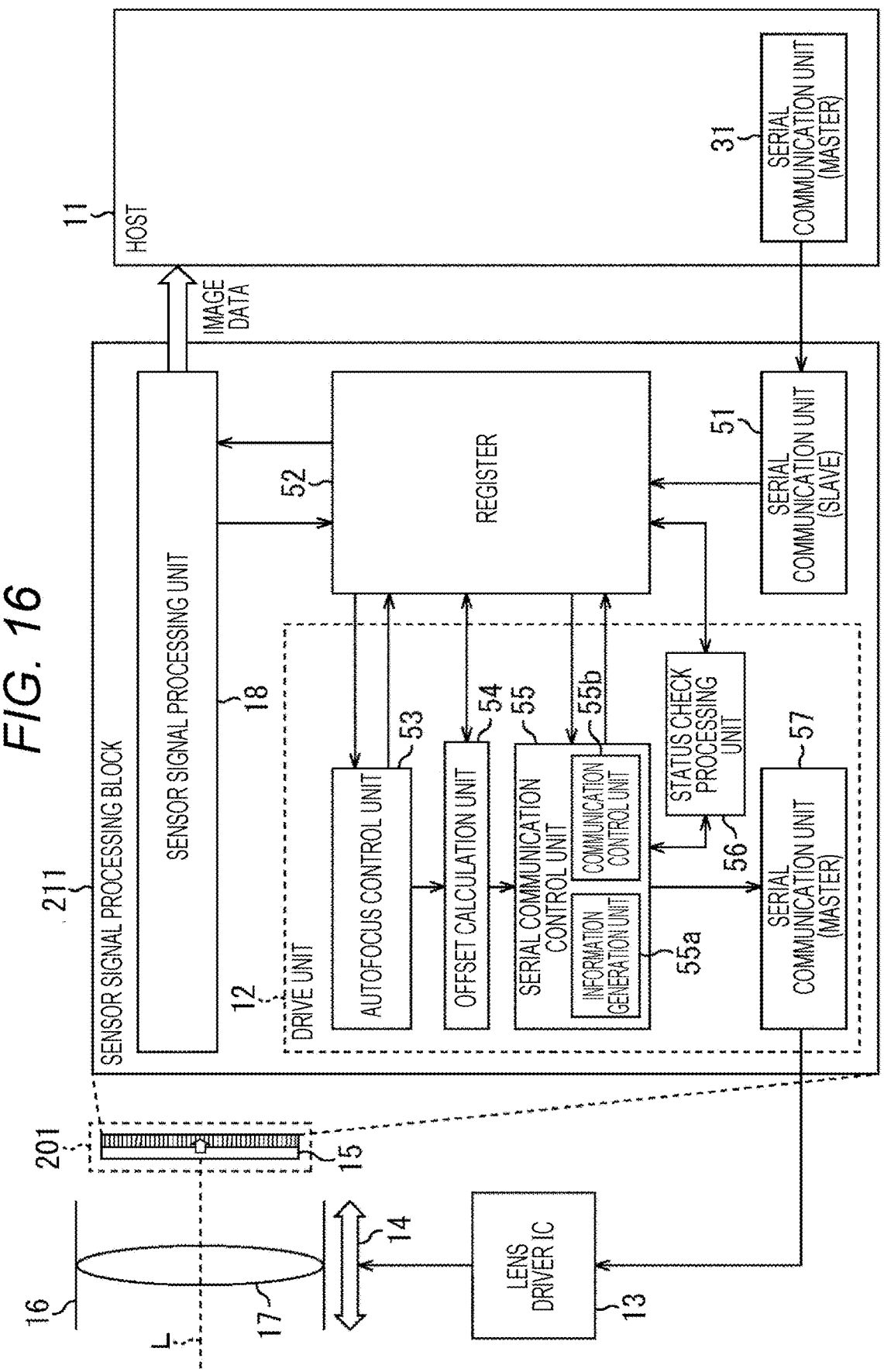
FIG. 16 is a diagram for explaining a third modification of an imaging apparatus to which the present technology is applied.

In the above described example, the sensor signal processing unit 18 and the AF drive control unit 12 are formed as separate components. However, as shown in FIG. 16, for example, a sensor signal processing block 211 formed with a logic circuit that integrates the sensor signal processing unit 18 and the AF drive control unit 12 may be formed, and be stacked on the imaging device 15 to form a solid-state imaging device block 201.

In such a configuration, the solid-state imaging device block 201 is provided in the stage following the lens tube 16, and presetting is simply performed, to control the operation of the lens driver IC 13 and process image data captured by the imaging device 15.

Also, only solid-state imaging device blocks 201 are manufactured and sold, and each manufacturer that assembles imaging apparatuses freely performs presetting through the host 11. Thus, it becomes possible to manufacture imaging apparatuses in conformity with the specifications of respective manufacturers.

Example Configuration of the Substrate of an Imaging Apparatus

Figure 17:
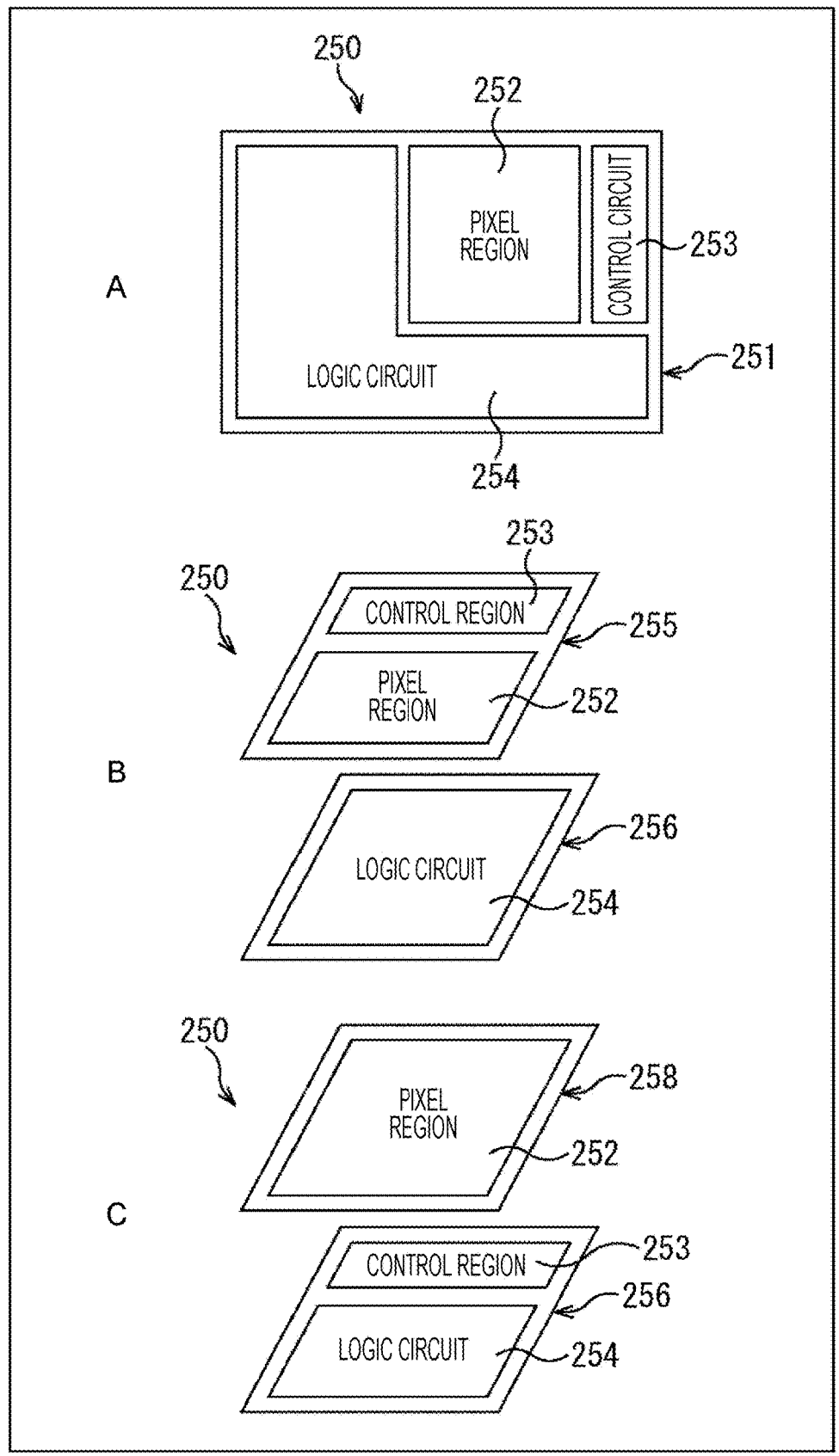
FIG. 17 is a diagram for explaining example substrate configurations of imaging apparatuses.

Referring now to FIG. 17, the substrate configurations of the imaging apparatuses shown in FIGS. 1, 14, and 16 are described.

An imaging apparatus to which the present technology is applied can be formed by using a semiconductor substrate including silicon (Si) or the like, and adopting one of first through third substrate configurations shown in A through C of FIG. 17.

A of FIG. 17 shows the first substrate configuration of an imaging apparatus.

An imaging apparatus 250 in A of FIG. 17 is formed by mounting a pixel region 252, a control circuit 253, and a logic circuit 254 for processing signals in one semiconductor substrate 251. The pixel region 252 in A of FIG. 17 includes, for example, the pixel array unit 61 of the imaging device 15 shown in FIGS. 1, 14, and 16, and the control circuit 253 in A of FIG. 17 includes the AD converter 62, the horizontal transfer unit 63, the timing control unit 64, the pixel drive unit 65 (any of which is shown in FIG. 2) and the like included in FIGS. 1, 14, and 16. Further, the logic circuit 254 in A of FIG. 17 includes the sensor signal processing unit 18 shown in FIG. 1, 14, or 16.

B of FIG. 17 shows the second substrate configuration of an imaging apparatus.

In the second substrate configuration, a first semiconductor substrate 255 and a second semiconductor substrate 256 are stacked on each other in the imaging apparatus. A pixel region 252 and a control circuit 253 are formed in the first semiconductor substrate 255, and a logic circuit 254 is formed in the second semiconductor substrate 256.

C of FIG. 17 shows the third substrate configuration of an imaging apparatus.

In the third substrate configuration, a first semiconductor substrate 255 and a second semiconductor substrate 256 are stacked on each other, as in the second substrate configuration. However, only a pixel region 252 is formed in the first semiconductor substrate 255, while a control circuit 253 and a logic circuit 254 are formed in the second semiconductor substrate 256.

An imaging apparatus can be manufactured with any of the above substrate configurations.

Example Applications to Electronic Apparatuses

An imaging apparatus to which the present technology is applied can be used in various kinds of electronic apparatuses, such as imaging apparatuses like digital still cameras and digital video cameras, portable telephone devices having imaging functions, and audio players having imaging functions. Also, an imaging apparatus may be in the form of a single chip, or may be in the form of a module that is formed by packaging the portion in which the imaging device 15 is formed and the sensor signal processing unit 18, and has an imaging function.

Figure 18:
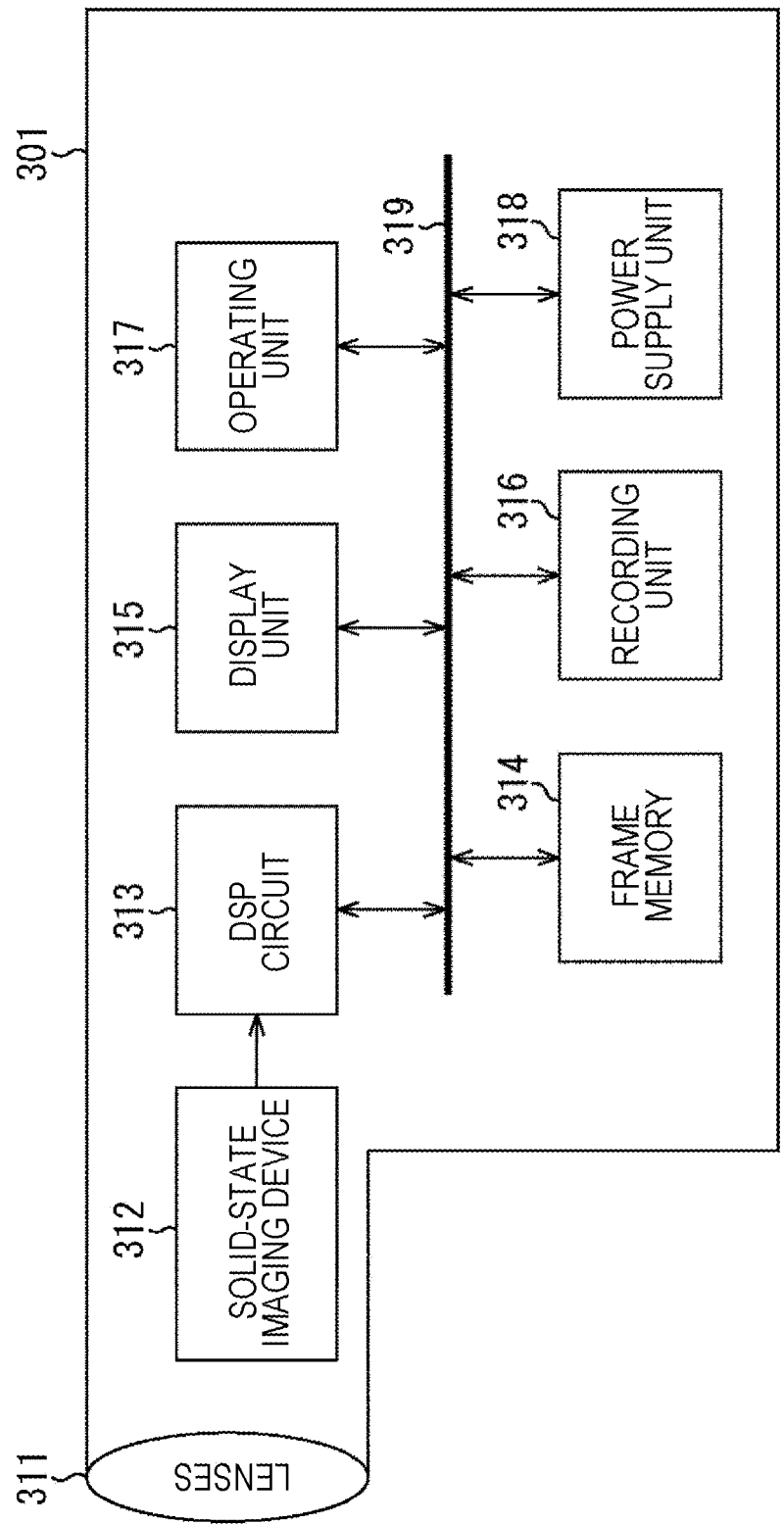
FIG. 18 is a diagram for explaining an application to an electronic apparatus.

FIG. 18 is a block diagram showing an example configuration of an imaging apparatus as an electronic apparatus to which the present technology is applied.

The imaging apparatus 301 in FIG. 18 includes an optical unit 311 formed with lenses and the like, a solid-state imaging device (an imaging device) 312, and a digital signal processor (DSP) circuit 313 having the functions of the above described signal processing circuit. The imaging apparatus 301 also includes a frame memory 314, a display unit 315, a recording unit 316, an operation unit 317, and a power supply unit 318. The DSP circuit 313, the frame memory 314, the display unit 315, the recording unit 316, the operation unit 317, and the power supply unit 318 are connected to one another via a bus line 319.

The optical unit 311 gathers incident light (image light) from an object and forms an image on the imaging surface of the solid-state imaging device 312. The solid-state imaging device 312 is equivalent to the imaging device 15 or the solid-state imaging device block 201 described above. The solid-state imaging device 312 converts the amount of the incident light, which has been gathered as the image on the imaging surface by the optical unit 311, into an electrical signal for each pixel, and outputs the electrical signal as a pixel signal.

The display unit 315 is formed with a panel display device such as a liquid crystal panel or an organic electro-luminescence (EL) panel, and displays a moving image or a still image formed by the solid-state imaging device 312. The recording unit 316 records the moving image or the still image formed by the solid-state imaging device 312 on a recording medium such as a hard disk or a semiconductor memory.

When operated by a user, the operation unit 317 issues operating instructions as to various functions of the imaging apparatus 301. The power supply unit 318 supplies various power sources as the operation power sources for the DSP circuit 313, the frame memory 314, the display unit 315, the recording unit 316, and the operation unit 317, as appropriate.

For example, the solid-state imaging device block 201 in FIG. 16 is provided as the solid-state imaging device 312 in the imaging apparatus 301 in FIG. 18, and is made to control a lens driver IC (not shown) that controls the operation of a focusing lens belonging to the optical unit 311. In this manner, effects similar to those of the above described imaging apparatuses can be achieved.

Examples of Use of an Image Sensor

Figure 19:
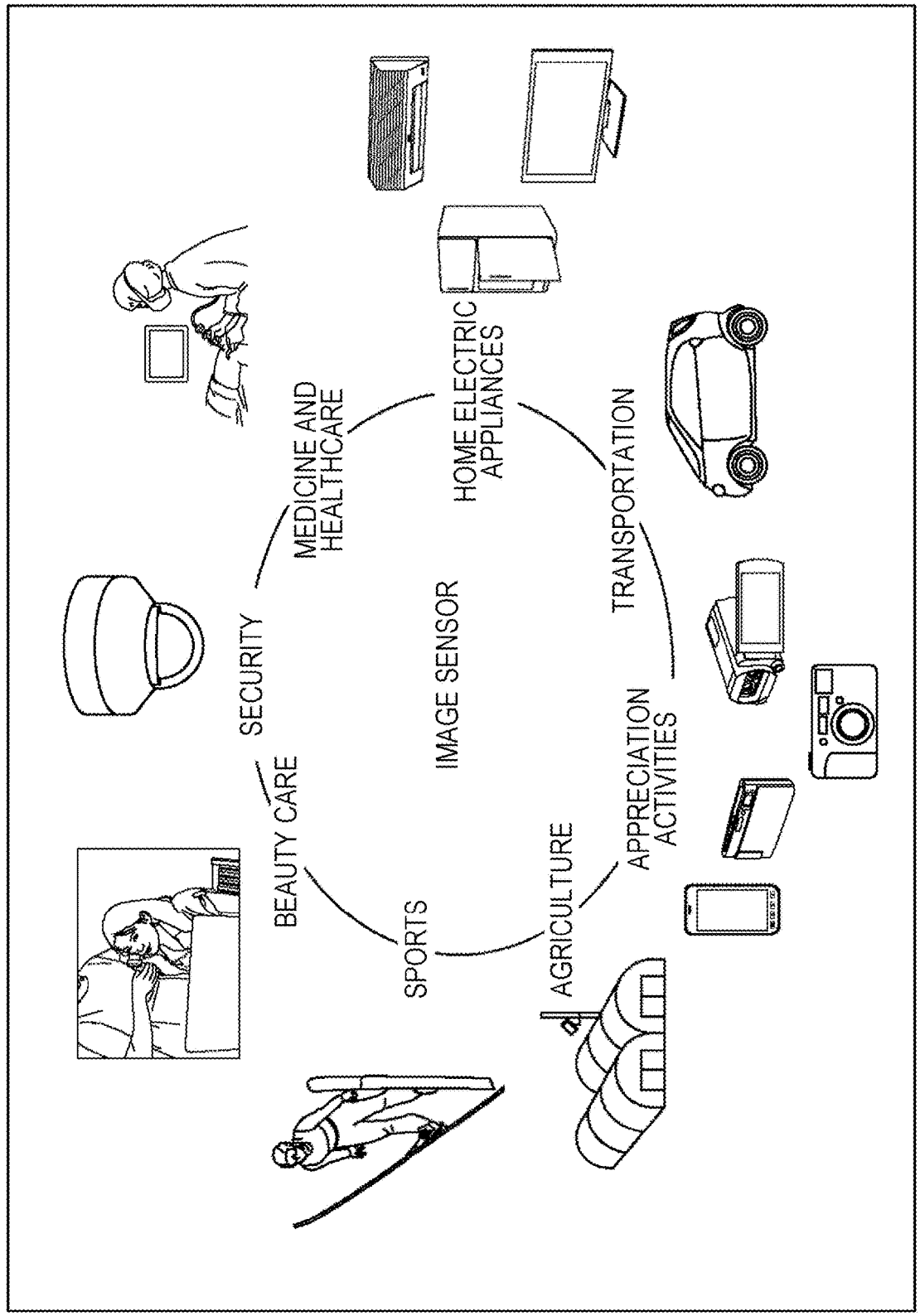
FIG. 19 is a diagram for explaining examples of use of an image sensor.

FIG. 19 is a diagram showing examples of use of the above-described imaging apparatus.

The above described imaging apparatus can be used in various cases where light such as visible light, infrared light, ultraviolet light, or an X-ray is sensed, as described below.

- Devices configured to take images for appreciation activities, such as digital cameras and portable devices with camera functions.
- Devices for transportation use, such as vehicle-mounted sensors configured to take images of the front, the back, the surroundings, the inside and the like of an automobile to perform safe driving like an automatic stop, recognize a driver's condition and the like, surveillance cameras for monitoring running vehicles and roads, and ranging sensors for measuring distances between vehicles or the like.
- Devices to be used in conjunction with home electric appliances, such as television sets, refrigerators, and air conditioners, to take images of gestures of users and operate the appliances in accordance with the gestures.
- Devices for medical care use and health care use, such as endoscopes and devices for receiving infrared light for angiography.
- Devices for security use, such as surveillance cameras for crime prevention and cameras for personal authentication.
- Devices for beauty care use, such as skin measurement devices configured to image the skin and microscopes for imaging the scalp.
- Devices for sporting use, such as action cameras and wearable cameras for sports.
- Devices for agricultural use such as cameras for monitoring conditions of fields and crops.

Examples where Processes are Carried Out by Software

While the above described series of processes can be performed by hardware, those processes can also be performed by software. In a case where the series of processes are performed by software, the program that forms the software may be installed in a computer incorporated into special-purpose hardware, or may be installed from a recording medium into a general-purpose personal computer or the like that can execute various kinds of functions by installing various kinds of programs.

Figure 20:
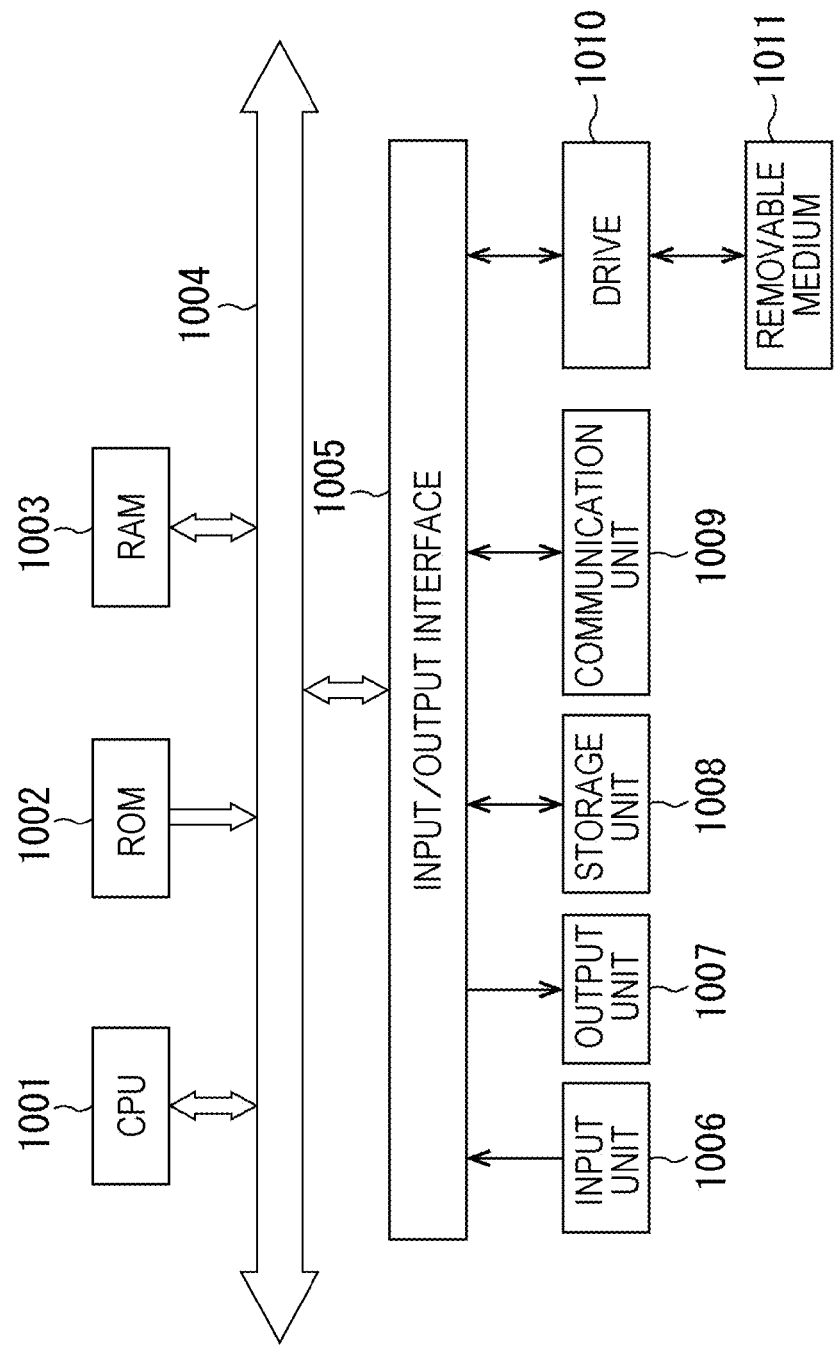
FIG. 20 is a diagram for explaining an example configuration of a general-purpose personal computer.

FIG. 20 shows an example configuration of a general-purpose personal computer. This personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

To the input/output interface 1005, the following components are connected: an input unit 1006 that is used by the user to input operation commands, and is formed with input devices such as a keyboard and a mouse; an output unit 1007 that outputs an image of a processing operation screen or a processing result to a display device; a storage unit 1008 that stores programs and various kinds of data, and is formed with a hard disk drive or the like; and a communication unit 1009 that is formed with a local area network (LAN) adapter or the like, and performs communication processes via a network that is typically the Internet. A drive 1010 is also connected to the input/output interface 1005. The drive 1010 performs data reading/writing on a removable medium 1011 that is a magnetic disk (such as a flexible disk), an optical disk (such as a Compact Disc-Read Only Memory (CD-ROM) or a Digital Versatile Disc (DVD)), a magnetooptical disk (such as a Mini Disc (MD)), a semiconductor memory, or the like.

The CPU 1001 performs various processes in accordance with a program that is stored in the ROM 1002, or a program that is read from the removable medium 1011, which is a magnetic disk, an optical disk, a magnetooptical disk, a semiconductor memory, or the like, is installed into the storage unit 1008, and is loaded from the storage unit 1008 into the RAM 1003. The RAM 1003 also stores data and the like necessary for the CPU 1001 to perform various processes, as appropriate.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) may be recorded on the removable medium 1011 as a packaged medium to be provided, for example. Alternatively, the program can be provided via a wired or wireless transmission medium, such as a local area network, the Internet, or digital satellite broadcasting.

In the computer, the program can be installed into the storage unit 1008 via the input/output interface 1005 when the removable medium 1011 is mounted on the drive 1010. Also, the program may be received by the communication unit 1009 via a wired or wireless transmission medium, and be installed into the storage unit 1008. Alternatively, the program may be installed beforehand into the ROM 1002 or the storage unit 1008.

It should be noted that the program to be executed by a computer may be a program for performing processes in chronological order in accordance with the sequence described in this specification, or may be a program for performing processes in parallel or performing a process when necessary, such as when there is a call.

Also, in this specification, a system means an assembly of components (devices, modules (parts), and the like), and not all the components need to be provided in the same housing. In view of this, devices that are housed in different housings and are connected to one another via a network form a system, and one device having modules housed in one housing is also a system.

It should be noted that embodiments of the present technology are not limited to the above described embodiments, and various modifications may be made to them without departing from the scope of the present technology.

For example, the present technology can be embodied in a cloud computing configuration in which one function is shared among devices via a network, and processing is performed by the devices cooperating with one another.

Also, the respective steps described with reference to the above described flowcharts can be carried out by one device or can be shared among devices.

Further, in a case where more than one process is included in one step, the processes included in the step can be performed by one device or can be shared among devices.

It should be noted that the present technology may also be embodied in the configurations described below.

<1> An information processing device including:
a control information generation unit that generates control information for controlling a current control target device to be controlled;
a storage unit that stores a parameter that is set in accordance with the current control target device;
a communication unit that communicates with the current control target device through serial communication;
a transmission information generation unit that generates transmission information in a format compatible with the current control target device, in accordance with the control information and the parameter stored in the storage unit; and
a communication control unit that performs control to cause the communication unit to transmit the transmission information to the current control target device.

<2> The information processing device of <1>, further including:
an imaging device that forms an image;
a lens that adjusts a focal point of light incident on the imaging device; and
an actuator that drives the lens,
in which
the current control target device is a lens driver integrated circuit (IC) that controls driving of the actuator, and
the control information generation unit generates an actuator control value as the control information, the actuator control value being for the lens driver IC to control the driving of the actuator.

<3> The information processing device of <2>, in which the storage unit stores a format related to the serial communication as the parameter.

<4> The information processing device of <3>, in which the storage unit stores data as the parameter in addition to the format related to the serial communication, the data being invariably input to the format.

<5> The information processing device of <4>, in which the storage unit stores at least one value as the data to be invariably input to the format, the at least one value being at least one of an identification value for identifying the lens driver IC, a communication amount, and a position of the actuator control value in the format, the at least one value being stored as the parameter.

<6> The information processing device of <3>, in which the storage unit stores a format related to transmission of the actuator control value through the serial communication, the format being stored as the parameter.

<7> The information processing device of <3>, in which the storage unit stores a format related to a request for information about an operation status of the lens driver IC at a time when the actuator control value is transmitted to the lens driver IC through the serial communication, the format being stored as the parameter.

<8> The information processing device of <7>, in which, in addition to the format related to the request for the information about an operation status of the lens driver IC at the time when the actuator control value is transmitted to the lens driver IC through the serial communication, the storage unit stores information related to error processing at a time when an error occurs in response to the request for the information about an operation status of the lens driver IC, the information related to error processing being stored as the parameter.

<9> The information processing device of <4>, in which the storage unit stores an offset value as the data to be invariably input to the format, the offset value being of an actuator control value corresponding to the lens driver IC, the offset value being stored as the parameter, the information processing device further includes an offset calculation unit that calculates an offset of the actuator control value using the offset value, the transmission information generation unit generates transmission information in accordance with the actuator control value corresponding to the lens driver IC having the actuator control value offset calculated by the offset calculation unit, and the communication control unit performs control to cause the communication unit to transmit the transmission information to the lens driver IC.

<10> The information processing device of any of <1> to <9>, in which the serial communication includes an inter-integrated circuit (I2C) method and a serial peripheral interface (SPI) method.

<11> The information processing device of any of <1> to <9>, in which the storage unit stores a parameter through a preset process, the parameter being set in accordance with the current control target device.

<12> The information processing device of any of <1> to <9>, in which the storage unit stores a parameter as a binarized binary program is loaded, the parameter being set in accordance with the current control target device.

<13> An information processing method including the steps of:

generating control information for controlling a current control target device to be controlled;

storing a parameter that is set in accordance with the current control target device;

communicating with the current control target device through serial communication;

generating transmission information in a format compatible with the current control target device, in accordance with the control information and the stored parameter; and performing control to cause the transmission information to be transmitted to the current control target device.

<14> A program for causing a computer to function as:

a control information generation unit that generates control information for controlling a current control target device to be controlled;

a storage unit that stores a parameter that is set in accordance with the current control target device;

a communication unit that communicates with the current control target device through serial communication;

a transmission information generation unit that generates transmission information in a format compatible with the current control target device, in accordance with the control information and the parameter stored in the storage unit; and a communication control unit that performs control to cause the communication unit to transmit the transmission information to the current control target device.

<15> A solid-state imaging device including:

an imaging device that forms an image;

a lens that adjusts a focal point of light incident on the imaging device;

an actuator that drives the lens;

a control information generation unit that generates control information for controlling a lens driver IC that controls driving of the actuator;

a storage unit that stores a parameter that is set in accordance with the lens driver IC;

a communication unit that communicates with the lens driver IC through serial communication;

a transmission information generation unit that generates transmission information in a format compatible with the lens driver IC, in accordance with the control information and the parameter stored in the storage unit; and a communication control unit that performs control to cause the communication unit to transmit the transmission information to the lens driver IC.

<16> The solid-state imaging device of <15>, further including:

a signal processing unit that processes a pixel signal captured by the imaging device; and a circuit board in which the control information generation unit, the communication unit, the storage unit, the communication control unit, and the signal processing unit are provided, in which a substrate in which the imaging device is provided and the circuit board are integrally formed.

<17> A method of operating a solid-state imaging device including:

an imaging device that forms an image;

a lens that adjusts a focal point of light incident on the imaging device; and an actuator that drives the lens, the method including the steps of:

generating control information for controlling a lens driver IC that controls driving of the actuator;

storing a parameter that is set in accordance with the lens driver IC;

communicating with the lens driver IC through serial communication;

generating transmission information in a format compatible with the lens driver IC, in accordance with the control information and the stored parameter; and performing control to cause the transmission information to be transmitted to the lens driver IC.

<18> A program for causing a computer to function as:

an imaging device that forms an image;

a lens that adjusts a focal point of light incident on the imaging device;

an actuator that drives the lens;

a control information generation unit that generates control information for controlling a lens driver IC that controls driving of the actuator;

a storage unit that stores a parameter that is set in accordance with the lens driver IC;

a communication unit that communicates with the lens driver IC through serial communication;

a transmission information generation unit that generates transmission information in a format compatible with the lens driver IC, in accordance with the control information and the parameter stored in the storage unit; and a communication control unit that performs control to cause the communication unit to transmit the transmission information to the lens driver IC.

<19> An electronic apparatus including:
an imaging device that forms an image;
a lens that adjusts a focal point of light incident on the imaging device;
an actuator that drives the lens;
a control information generation unit that generates control information for controlling a lens driver IC that controls driving of the actuator;
a storage unit that stores a parameter that is set in accordance with the lens driver IC;
a communication unit that communicates with the lens driver IC through serial communication;
a transmission information generation unit that generates transmission information in a format compatible with the lens driver IC, in accordance with the control information and the parameter stored in the storage unit; and
a communication control unit that performs control to cause the communication unit to transmit the transmission information to the lens driver IC.

REFERENCE SIGNS LIST

11 Host
12 AF drive control unit
13 Lens driver IC
14 Actuator
15 Imaging device
16 Lens tube
17 Lens
31 Serial communication unit (master)
51 Serial communication unit (slave)
52 Register
53 Autofocus control unit
54 Offset unit
55 Serial communication control unit
55a Information generation unit
55b Communication control unit
56 Status check processing unit
57 Serial communication unit (master)
61 Pixel array unit
62 AD converter
63 Horizontal transfer unit
64 Timing control unit
65 Pixel drive unit
111 Binary Program
201 Solid-state imaging device block
211 Sensor signal processing Block

The invention claimed is:

1. An information processing device comprising:
circuitry configured to function as:
a control information generation unit that generates control information for controlling a current control target device to be controlled;
a storage unit that stores a parameter that is set in accordance with the current control target device;
a communication unit that communicates with the current control target device through serial communication;
a transmission information generation unit that generates transmission information in a format compatible with the current control target device, in accordance with the control information and the parameter stored in the storage unit; and
a communication control unit that performs control to cause the communication unit to transmit the transmission information to the current control target device.

2. The information processing device according to claim 1, further comprising:
an imaging device that forms an image;
a lens that adjusts a focal point of light incident on the imaging device; and
an actuator that drives the lens,
wherein
the current control target device is a lens driver integrated circuit (IC) that controls driving of the actuator, and
the control information generation unit generates an actuator control value as the control information, the actuator control value being for the lens driver IC to control the driving of the actuator.

3. The information processing device according to claim 2, wherein the storage unit stores a format related to the serial communication as the parameter.

4. The information processing device according to claim 3, wherein the storage unit stores data as the parameter in addition to the format related to the serial communication, the data being invariably input to the format.

5. The information processing device according to claim 4, wherein the storage unit stores at least one value as the data to be invariably input to the format, the at least one value being at least one of an identification value for identifying the lens driver IC, a communication amount, and a position of the actuator control value in the format, the at least one value being stored as the parameter.

6. The information processing device according to claim 3, wherein the storage unit stores a format related to transmission of the actuator control value through the serial communication, the format being stored as the parameter.

7. The information processing device according to claim 3, wherein the storage unit stores a format related to a request for information about an operation status of the lens driver IC at a time when the actuator control value is transmitted to the lens driver IC through the serial communication, the format being stored as the parameter.

8. The information processing device according to claim 7, wherein, in addition to the format related to the request for the information about an operation status of the lens driver IC at the time when the actuator control value is transmitted to the lens driver IC through the serial communication, the storage unit stores information related to error processing at a time when an error occurs in response to the request for the information about an operation status of the lens driver IC, the information related to error processing being stored as the parameter.

9. The information processing device according to claim 4, wherein
the storage unit stores an offset value as the data to be invariably input to the format, the offset value being of an actuator control value corresponding to the lens driver IC, the offset value being stored as the parameter,
the information processing device further includes an offset calculation unit that calculates an offset of the actuator control value using the offset value,
the transmission information generation unit generates transmission information in accordance with the actuator control value corresponding to the lens driver IC having the actuator control value offset calculated by the offset calculation unit, and the communication control unit performs control to cause the communication unit to transmit the transmission information to the lens driver IC.

10. The information processing device according to claim 1, wherein the serial communication includes an inter-integrated circuit (I2C) method and a serial peripheral interface (SPI) method.

11. The information processing device according to claim 1, wherein the storage unit stores a parameter through a preset process, the parameter being set in accordance with the current control target device.

12. The information processing device according to claim 1, wherein the storage unit stores a parameter as a binarized binary program is loaded, the parameter being set in accordance with the current control target device.

13. An information processing method comprising the steps of:
   generating control information for controlling a current control target device to be controlled;
   storing a parameter that is set in accordance with the current control target device;
   communicating with the current control target device through serial communication;
   generating transmission information in a format compatible with the current control target device, in accordance with the control information and the stored parameter; and
   performing control to cause the transmission information to be transmitted to the current control target device.

14. At least one non-transitory computer-readable storage medium encoded with executable instructions that, when executed by at least one processor, cause the at least one processor to function as:
   a control information generation unit that generates control information for controlling a current control target device to be controlled;
   a storage unit that stores a parameter that is set in accordance with the current control target device;
   a communication unit that communicates with the current control target device through serial communication;
   a transmission information generation unit that generates transmission information in a format compatible with the current control target device, in accordance with the control information and the parameter stored in the storage unit; and
   a communication control unit that performs control to cause the communication unit to transmit the transmission information to the current control target device.

15. A solid-state imaging device comprising:
   an imaging device that forms an image;
   a lens that adjusts a focal point of light incident on the imaging device;
   an actuator that drives the lens;
   circuitry configured to function as:
      a control information generation unit that generates control information for controlling a lens driver IC that controls driving of the actuator;
      a storage unit that stores a parameter that is set in accordance with the lens driver IC;
      a communication unit that communicates with the lens driver IC through serial communication;
      a transmission information generation unit that generates transmission information in a format compatible with the lens driver IC, in accordance with the control information and the parameter stored in the storage unit; and
      a communication control unit that performs control to cause the communication unit to transmit the transmission information to the lens driver IC.

16. The solid-state imaging device according to claim 15, further comprising:
   a signal processing unit that processes a pixel signal captured by the imaging device; and
   a circuit board in which the control information generation unit, the communication unit, the storage unit, the communication control unit, and the signal processing unit are provided,
   wherein a substrate in which the imaging device is provided and the circuit board are integrally formed.

17. A method of operating a solid-state imaging device including:
   an imaging device that forms an image;
   a lens that adjusts a focal point of light incident on the imaging device; and
   an actuator that drives the lens,
   the method comprising the steps of:
      generating control information for controlling a lens driver IC that controls driving of the actuator;
      storing a parameter that is set in accordance with the lens driver IC;
      communicating with the lens driver IC through serial communication;
      generating transmission information in a format compatible with the lens driver IC, in accordance with the control information and the stored parameter; and
      performing control to cause the transmission information to be transmitted to the lens driver IC.

18. At least one non-transitory computer-readable storage medium encoded with executable instructions that, when executed by at least one processor, cause the at least one processor to function as:
   an imaging device that forms an image;
   a lens that adjusts a focal point of light incident on the imaging device;
   an actuator that drives the lens;
   a control information generation unit that generates control information for controlling a lens driver IC that controls driving of the actuator;
   a storage unit that stores a parameter that is set in accordance with the lens driver IC;
   a communication unit that communicates with the lens driver IC through serial communication;
   a transmission information generation unit that generates transmission information in a format compatible with the lens driver IC, in accordance with the control information and the parameter stored in the storage unit; and
   a communication control unit that performs control to cause the communication unit to transmit the transmission information to the lens driver IC.

19. An electronic apparatus comprising:
   an imaging device that forms an image;
   a lens that adjusts a focal point of light incident on the imaging device;
   an actuator that drives the lens;
   a control information generation unit that generates control information for controlling a lens driver IC that controls driving of the actuator;
   circuitry configured to function as:
      a storage unit that stores a parameter that is set in accordance with the lens driver IC;
      a communication unit that communicates with the lens driver IC through serial communication;

a transmission information generation unit that generates transmission information in a format compatible with the lens driver IC, in accordance with the control information and the parameter stored in the storage unit; and
a communication control unit that performs control to cause the communication unit to transmit the transmission information to the lens driver IC.

* * * * *